United States Patent
Qaise et al.

(10) Patent No.: US 12,057,925 B2
(45) Date of Patent: Aug. 6, 2024

(54) FREQUENCY SYNCHRONIZATION FOR NON-TERRESTRIAL CELLULAR WIRELESS COMMUNICATION NETWORKS

(71) Applicant: OQ Technology S.a.r.l., Wasserbillig (LU)

(72) Inventors: Omar Qais Talib Qaise, Trier (DE); Prasanna Balasubramanian Nagarajan, Trier (DE); Cyril Marc Dufoing, Heyd (BE)

(73) Assignee: OQ Technology S.á.r.l., Wasserbilig (LU)

( * ) Notice: Subject to any disclaimer, the term of this patent is extended or adjusted under 35 U.S.C. 154(b) by 0 days.

(21) Appl. No.: 18/181,428

(22) Filed: Mar. 9, 2023

(65) Prior Publication Data
US 2023/0216580 A1    Jul. 6, 2023

Related U.S. Application Data

(63) Continuation of application No. 17/396,507, filed on Aug. 6, 2021, which is a continuation of application
(Continued)

(30) Foreign Application Priority Data

Oct. 12, 2018 (EP) .................................. 18200058
Aug. 13, 2019 (EP) .................................. 19191615

(51) Int. Cl.
*H04B 7/185*    (2006.01)
*H04W 84/06*    (2009.01)

(52) U.S. Cl.
CPC ..... *H04B 7/18539* (2013.01); *H04B 7/18504* (2013.01); *H04W 84/06* (2013.01)

(58) Field of Classification Search
CPC ........... H04B 7/18504; H04B 7/18539; H04W 72/0406; H04W 74/04; H04W 84/06
See application file for complete search history.

(56) References Cited

U.S. PATENT DOCUMENTS

| 5,659,545 A | 8/1997 | Sowles et al. |
| 5,867,789 A | 2/1999 | Olds et al. |

(Continued)

FOREIGN PATENT DOCUMENTS

| CA | 2633051 A1 | 11/2009 |
| CN | 109361449 A | 2/2019 |

(Continued)

OTHER PUBLICATIONS

Guidotti, A., et al., "Architectures and Key Technical Challenges for 5G Systems Incorporating Satellites," submitted to Transactions on Vehicular Technologies as early as Jun. 6, 2018, 18 pages.

(Continued)

*Primary Examiner* — Alpus Hsu
(74) *Attorney, Agent, or Firm* — CHRISTENSEN O'CONNOR JOHNSON KINDNESS PLLC

(57) ABSTRACT

A method for estimating a location of a terminal device of a non-terrestrial cellular data communication network is disclosed. The non-terrestrial cellular data communication network includes at least one airborne or spaceborne base station moving along a flight trajectory. The terminal device and a location service node store information describing the flight trajectory of the at least one airborne or spaceborne base station. The method further includes: at the at least one airborne or spaceborne base station, transmitting a reference timing signal; at the terminal device, accumulating over time the respective arrival times of the reference timing signal received from at least three different positions taken by the at least one airborne or spaceborne base station; and at the terminal device, computing, from said arrival times, at least (Continued)

two arrival time differences with respect to one reference arrival time.

24 Claims, 12 Drawing Sheets

Related U.S. Application Data

No. 17/227,218, filed on Apr. 9, 2021, now Pat. No. 11,309,957, which is a continuation of application No. PCT/EP2019/077813, filed on Oct. 14, 2019.

(56) References Cited

U.S. PATENT DOCUMENTS

| | | | |
|---|---|---|---|
| 5,974,314 A | 10/1999 | Hudson | |
| 6,137,441 A | 10/2000 | Dai et al. | |
| 7,375,682 B1 | 5/2008 | Tester et al. | |
| 7,436,357 B2 | 10/2008 | Wang et al. | |
| 7,636,635 B2 | 12/2009 | Winkler et al. | |
| 7,908,046 B2* | 3/2011 | Huynh | G08G 5/006 701/14 |
| 8,120,530 B2 | 2/2012 | Weng | |
| 8,248,997 B2* | 8/2012 | Charbit | H04B 17/27 370/328 |
| 8,340,663 B2 | 12/2012 | Tieftrunk et al. | |
| 8,447,520 B2 | 5/2013 | Gine I Cortiella et al. | |
| 8,483,707 B2* | 7/2013 | Krishnamurthy | G01S 5/0036 370/320 |
| 8,494,761 B2 | 7/2013 | Giovannini et al. | |
| 8,537,751 B2 | 9/2013 | Nylander et al. | |
| 8,537,789 B2 | 9/2013 | Adams et al. | |
| 8,588,759 B2 | 11/2013 | Moe et al. | |
| 8,654,726 B2 | 2/2014 | Park et al. | |
| 8,816,903 B2 | 8/2014 | Sengupta et al. | |
| 8,954,089 B2* | 2/2015 | Werner | G01S 5/10 455/414.1 |
| 9,098,997 B2 | 8/2015 | Stewart et al. | |
| 9,226,236 B2 | 12/2015 | Lee et al. | |
| 9,380,499 B2 | 6/2016 | Kang et al. | |
| 9,549,288 B2* | 1/2017 | Werner | G01S 5/10 |
| 9,583,008 B2 | 2/2017 | Marion et al. | |
| 9,622,277 B1 | 4/2017 | Sun et al. | |
| 9,661,604 B1 | 5/2017 | O'Shea et al. | |
| 9,668,210 B2 | 5/2017 | Grant et al. | |
| 9,679,413 B2 | 6/2017 | Xu et al. | |
| 9,743,367 B2 | 8/2017 | Das et al. | |
| 9,947,230 B2 | 4/2018 | Hu et al. | |
| 9,973,268 B1 | 5/2018 | Husted | |
| 10,004,057 B2* | 6/2018 | Chae | H04W 64/006 |
| 10,157,545 B1 | 12/2018 | Baker | |
| 10,181,896 B1 | 1/2019 | Swift et al. | |
| 10,516,468 B2 | 12/2019 | Yoon et al. | |
| 10,671,091 B2 | 6/2020 | Tate | |
| 10,859,595 B2* | 12/2020 | Kommi | G01S 5/0036 |
| 10,897,686 B2* | 1/2021 | Do | H04W 4/023 |
| 2004/0109475 A1 | 6/2004 | Elam | |
| 2004/0110514 A1 | 6/2004 | Kim et al. | |
| 2008/0117103 A1 | 5/2008 | Wang et al. | |
| 2008/0170536 A1 | 7/2008 | Marshack et al. | |
| 2009/0160710 A1* | 6/2009 | Hwang | G01S 5/10 342/387 |
| 2009/0161578 A1 | 6/2009 | Yeung et al. | |
| 2009/0279476 A1 | 11/2009 | Li et al. | |
| 2016/0295374 A1* | 10/2016 | Persson | G01S 5/06 |
| 2016/0297545 A1 | 10/2016 | Yang et al. | |
| 2017/0019800 A1 | 1/2017 | Liu et al. | |
| 2017/0127332 A1 | 5/2017 | Axmon et al. | |
| 2017/0142682 A1* | 5/2017 | Gunnarsson | H04W 72/51 |
| 2017/0168163 A1 | 6/2017 | Small | |
| 2017/0187450 A1 | 6/2017 | Jalali | |
| 2017/0331710 A1 | 11/2017 | Cody | |
| 2018/0011163 A1* | 1/2018 | Han | G01S 5/0236 |
| 2018/0041944 A1 | 2/2018 | Korneluk et al. | |
| 2018/0102831 A1 | 4/2018 | Murphy | |
| 2018/0206133 A1 | 7/2018 | Venkatraman et al. | |
| 2018/0241464 A1 | 8/2018 | Michaels | |
| 2019/0025437 A1 | 1/2019 | Derbez et al. | |
| 2019/0058522 A1 | 2/2019 | Haley et al. | |
| 2019/0166452 A1* | 5/2019 | Tenny | G01S 5/14 |
| 2019/0208387 A1 | 7/2019 | Jiang et al. | |
| 2019/0230618 A1* | 7/2019 | Saur | H04W 56/001 |
| 2019/0285721 A1* | 9/2019 | Xiong | G01S 5/10 |
| 2019/0323807 A1 | 10/2019 | Smith et al. | |
| 2019/0353800 A1 | 11/2019 | Nirula et al. | |

FOREIGN PATENT DOCUMENTS

| | | |
|---|---|---|
| EP | 927362 B1 | 3/2004 |
| EP | 2161854 A2 | 3/2010 |
| EP | 2735883 A1 | 5/2014 |
| EP | 3048745 A1 | 7/2016 |
| EP | 2622915 B1 | 4/2018 |
| EP | 3064856 A1 | 10/2018 |
| WO | 95/13671 A1 | 5/1995 |
| WO | 9513671 A1 | 5/1995 |
| WO | 02/09318 A2 | 1/2002 |
| WO | 0209318 A2 | 1/2002 |
| WO | 9209318 A2 | 1/2002 |
| WO | 2010/095851 A2 | 8/2010 |
| WO | 2010095851 A2 | 8/2010 |
| WO | 2012/110143 A1 | 8/2012 |
| WO | 2012110143 A1 | 8/2012 |
| WO | 2012/126828 A1 | 9/2012 |
| WO | 2012126828 A1 | 9/2012 |
| WO | 2015/175291 A1 | 11/2015 |
| WO | 2015175291 A1 | 11/2015 |
| WO | 2016/090411 A1 | 6/2016 |
| WO | 2016090411 A1 | 6/2016 |
| WO | 2017/072745 A1 | 5/2017 |
| WO | 2017072745 A1 | 5/2017 |
| WO | 2017/143388 A1 | 8/2017 |
| WO | 2017143388 A1 | 8/2017 |
| WO | 2018/026405 A2 | 2/2018 |
| WO | 2018026405 A2 | 2/2018 |
| WO | 2019/032036 A1 | 2/2019 |
| WO | 2019032036 A1 | 2/2019 |
| WO | 2019/097922 A1 | 5/2019 |
| WO | 2019097922 A1 | 5/2019 |

OTHER PUBLICATIONS

International Search Report and Written Opinion, dated Dec. 13, 2019, issued in corresponding International Application No. PCT/EP2019/077813, filed Oct. 14, 2019, 10 pages.

Niemelä, P., "Narrowband LTE in Machine to Machine Satellite Communication," master's thesis, Aalto University, Espoo, Finland, 2018, 31 pages.

Extended European Search Report, EP Application No. 21180733, dated Sep. 28, 2021, 8 pages.

European Office Action mailed Jun. 21, 2023, issued in related European Application No. 21189020.7 filed Oct. 14, 2019, 5 pages.

* cited by examiner

FREQUENCY SYNCHRONIZATION FOR NON-TERRESTRIAL CELLULAR WIRELESS COMMUNICATION NETWORKS

CROSS-REFERENCES TO RELATED APPLICATIONS

This application is a continuation of U.S. application Ser. No. 17/396,507, filed Aug. 6, 2021, which is a continuation of U.S. application Ser. No. 17/227,218, filed Apr. 9, 2021, now U.S. Pat. No. 11,309,957, issued Apr. 19, 2022, which is a continuation of International Application No. PCT/EP2019/077813, filed Oct. 14, 2019, which claims the benefit of European Application No. 19191615.4, filed Aug. 13, 2019, and European Application No. 18200058.8, filed Oct. 12, 2018 the entire disclosures of which are hereby incorporated by reference herein.

TECHNICAL FIELD

The present invention lies in the field of cellular wireless communication systems. In particular, the invention relates to cellular wireless communication systems comprising non-terrestrial network infrastructure, such as a cellular base station hosted on a satellite payload.

BACKGROUND OF THE INVENTION

Cellular wireless communication networks are nowadays widely available in developed and mainly urban environments. A ground-based network allows a user equipment, such as a telephone, smartphone or personal computer, to establish a data communication link with a data network such as the public Internet via a base station that manages the geographical network cell in which they evolve.

Several cellular network standards have been deployed based on GSM technology, UMTS/3G, LTE/4G and 5G networking technology. Crucially, when no cellular network infrastructure is available in a given geographic area, no wireless data communication is available for any users or device in that area. In remote areas, the construction if network infrastructure is often difficult and overly costly given a low population or device density.

The Internet of Things is a paradigm in which devices such as objects or sensors are able to enter into communication with a remote network backend, such as a data center or data processing server. The transmission of data from an IoT device is often not delay critical. However, a reliable communication link to the network backend needs to be established, at least intermittently. IoT devices may for example be deployed on maritime vessels, or in remote areas. However, in such areas, cellular network access is often not provided by the traditional fixed networking infrastructure. Such devices are usually battery-powered, so that the available transmit power is limited at any point in time.

The deployment a non-terrestrial cellular wireless communication network, involving a partly airborne/spaceborne network architecture appears to be an interesting solution for providing cellular data network coverage to the requisite remote areas. However, at the time of writing there is no solution in the state of the art which would enable cellular access from a piece of user equipment having low available power, via a non-terrestrial piece of network infrastructure equipment. Today's communication standards have indeed been designed with unlimited power as a prerequisite for the infrastructure, as well as low delays and stationary location with respect to the user equipment.

Technical Problem to be Solved

It is an objective to present method and device, which overcome at least some of the disadvantages of the prior art.

SUMMARY OF THE INVENTION

In accordance with a first aspect, a control method for a terminal device in a non-terrestrial cellular data communication network is provided. The network comprises at least one airborne or spaceborne base station moving along a flight trajectory, for connecting the terminal device to said network. The method is remarkable in that it comprises the following steps:

a) providing flight trajectory data for said base station in a memory element of said terminal device;
b) providing terminal location data in a memory element of said terminal device;
c) using a data processing unit, determining at least one time slot during which a wireless communication channel between said terminal device and said base station is estimated to be available, based on said flight trajectory data and on said terminal location data;
d) using a data processing unit, scheduling a data reception or transmission between said terminal device and said base station during the determined time slot.

Preferably, the step of scheduling a data reception transmission comprises switching the terminal device's state using said data processing unit from a first state, in which the device is not capable of receiving and/or transmitting data, to a second state, in which the device is capable of receiving and/or transmitting data using a data reception and transmission unit. Preferably, the first state is characterized by a power consumption of the terminal device that is lower than the power consumption of the terminal device when the latter is in the second state. In the first state, the terminal device may preferably be configured to carry out other tasks, such as sensing or processing data, rather than receiving/transmitting data to/from an airborne/spaceborne base station of the cellular network.

Preferably, said data processing unit is a data processing unit of said terminal device. The data processing unit may preferably comprise a central processing unit, CPU, operatively coupled to a memory element comprising any of a solid-state drive, SSD, hard disk drive, HDD, random access memory, RAM, or any other known data storage element. The data reception and data transmission means may preferably comprise a cellular networking interface, comprising a receive antenna and a transmit antenna, as well as any required subsystems thereof, for operatively connecting said terminal device to the non-terrestrial cellular data communication network. Alternatively, the terminal device may have remote access, by means of a data communication channel, to said data processing means. The data processing unit may be provided by set of distributed computing devices configured for providing the described functionality.

Preferably, the step of providing flight trajectory data may comprise, at the base station, transmitting said flight trajectory data to said terminal device, and at the terminal device, using a data reception unit, receiving said flight trajectory data from said base station through a wireless data communication channel.

Said data may preferably be broadcast to any available terminal devices form said base station.

The base station may preferably receive said flight trajectory data from a ground-based network node. Alternatively, the base station may comprise a memory element on which said flight trajectory data has been pre-stored.

The flight trajectory data may preferably comprise an identifier of said base station, ephemeris data, altitude data, velocity data or any combination thereof.

Preferably, the flight trajectory data may comprise flight trajectory data describing the trajectories of a plurality of airborne or spaceborne base stations, together with their respective identifiers.

The terminal device may preferably compute, using said data processing unit and based on said flight trajectory data, estimate values for said base station, comprising any of a future position, elevation, velocity, Doppler shift, Doppler drift, propagation delay, derivatives of said Doppler shift or propagation delay, or any combination thereof, and stores these estimate values in a memory element.

The non-terrestrial cellular data communication network may preferably comprise at least two airborne or spaceborne base stations. The step of providing terminal location data may further preferably comprise the additional step of estimating the terminal device's location based on detected properties of signals received at the terminal device from said base stations.

In accordance with another aspect, a control method for a terminal device in a non-terrestrial cellular data communication network is provided. The method is remarkable in that it comprises the step of estimating the terminal device's location based on detected properties of at least three signals received at the terminal device from different positions taken by at least one base station. Preferably the three positions may correspond to three flyovers of the base station over the terminal device.

Preferably, said at least one airborne or spaceborne base stations may be configured for transmitting a reference timing signal to said terminal device, and the non-terrestrial cellular data communication network may preferably comprise a location service node storing information describing each base station's respective flight trajectory, and wherein the step of providing terminal location data further comprises the following preliminary steps:
- at the terminal device, accumulating over time the respective arrival times of the reference timing signal received from at three different positions taken by at least one base station;
- computing, from said arrival times, at least two arrival time differences with respect to one reference arrival time; the reference arrival time may be preferably be selected among said accumulated arrival times;
- transmitting, at the terminal device, said computed differences to said location service node, through one of said base stations;
- at said location service node, receiving said computed differences, computing a location estimate of said terminal device using said computed differences and said stored information describing each base station's respective flight trajectory, and transmitting said location estimate to said terminal device, through one of said base stations; and
- at the terminal device, receiving said location estimate from one of said base stations and storing it in a memory element.

The three different position of the base stations preferably correspond to three different reception times of the reference timing signal at the terminal device, as the position of the base stations evolves along its trajectory.

Alternatively, the terminal device may transmit said measured arrival times to a network node, for example to said location service node, which is further configured for computing said arrival time differences.

Preferably, the non-terrestrial cellular data communication network may comprise a plurality of airborne or spaceborne base stations configured for transmitting a common synchronized reference timing signal, and the step of accumulating said arrival times may comprise the reception of the reference timing signal at the terminal device from at least two or three of said airborne or spaceborne space stations. The arrival times may be accumulated from a plurality of base stations that are within the terminal device's line of sight at the same time, or from a single base station changing its position relative to the terminal device over time, or from a plurality of base stations changing their positions relative to the terminal device over time.

Preferably, the terminal device may further receive, during said scheduled time slot, a synchronization signal from said base station, the synchronization signal carrying data indicating a transmission frequency and timing information, which are required for the terminal device to synchronize future data transmission and/or data reception to/from said base station.

In accordance with another aspect, a control method for a terminal device in a non-terrestrial cellular data communication network is provided. The network comprises at least one airborne or spaceborne base station moving along a flight trajectory, for connecting the terminal device to said network. The method is remarkable in that it comprises the following steps:
- at the terminal device, receiving a synchronization signal from said base station, the synchronization signal carrying data indicating a transmission frequency and timing information, which are required for the terminal to synchronize future data transmission and/or data reception to/from said base station.

Preferably, the terminal device may compute, using a data processing unit, an observed Doppler shift based on the receiving frequency for said synchronization signal and on the transmission frequency indicated therein, and the terminal device may pre-emptively compensate said transmission frequency by a frequency compensation value during a subsequent data transmission to said base station, said frequency compensation value taking into account any of said observed Doppler shift. Said computation may alternatively be done at a remote processing unit, to which the terminal device has access.

Preferably, said frequency compensation value may further take into account any of said estimated Doppler shift values, Doppler drift, a derivative of the observed Doppler shift, or any combinations thereof, at the time of said subsequent data transmission.

The terminal may further preferably compute, using a data processing unit, an observed time shift based on the reception time of said synchronization signal and on the timing information indicated therein, and the terminal device may further pre-emptively compensate the scheduled time of transmission by a time compensation value during a subsequent data transmission to said base station, said time compensation value taking into account said observed time shift, and/or any derivative thereof. Alternatively, said computation may be done at a remote processing unit to which the terminal device has access.

Preferably, said time compensation value may further take into account a constant timing offset that is a function of the base station's position. Preferably said time compensation value may depend on the base station's altitude.

Preferably, a base station is may be estimated to be available, if its elevation above said terminal device is estimated to be above a predetermined elevation threshold value. Said threshold value may be in the range between 45° and 70°, it may further preferably be of 60°.

The base station may preferably be an airborne base station comprising any of a high-altitude platform, HAP, a drone, or an airplane.

The base station may preferably be part of a fleet of interconnected airborne base stations.

Preferably, the base station may be a spaceborne base stations comprising a Low Earth Orbit, LEO, Middle Earth Orbit, MEO or Geostationary Orbit, GEO satellite.

Said satellite may preferably be part of a constellation of satellites, wherein a plurality of satellites are interconnected base stations of said non-terrestrial cellular data communication network.

Preferably, interconnect base stations exchange data describing respectively connected terminal devices with each other, in order to facilitate a handover between two base stations. Preferably, each base station stores identifiers of currently neighbouring base stations in a memory element, and updates these periodically.

Preferably, each base station stores data describing respectively connected terminal device in a memory element and updates these periodically.

Preferably, each airborne or spaceborne base station periodically updates data describing the set of currently neighbouring airborne or spaceborne base stations. Said data preferably describes all neighbouring base station that may currently be interconnected.

The flight trajectory data may preferably comprise Two-Line-Element, TLE, data.

The terminal device may preferably be a user equipment or a ground-based gateway node serving a plurality of user equipment.

In accordance with a further aspect, a terminal device for a non-terrestrial cellular data communication network is provided. The terminal device comprises a data transmission unit, a data reception unit, a memory element for storing flight trajectory data of an airborne or spaceborne base station of said network, a memory element for storing it location data, and a processing unit, wherein the processing unit if configured to:

determine at least one time slot during which a wireless communication channel between said terminal device and said base station is estimated to be available, based on said flight trajectory data and on said terminal location data, and schedule a data reception or transmission between said terminal device and said base station during the determined time slot.

Preferably, the processing unit may further be configured to implement the terminal device-based method steps in accordance with any of the above aspects.

In accordance with another aspect, a base station for a non-terrestrial cellular data communication network is provided. It comprises a data transmission unit, a data reception unit, a memory element and a data processing unit, wherein the data processing unit is configured for transmitting data describing a projected or actual flight trajectory of the base station.

The base station may preferably comprise a satellite, a drone, a high-altitude platform or an airplane.

In accordance with yet another aspect, a non-terrestrial cellular data communication system is provided. The communication system comprises at least one terminal device as discussed above, and at least one airborne or spaceborne base station as discussed above.

Preferably, the communication system may comprise a 4G Narrowband Internet-of-Things communication system. Preferably, the airborne or spaceborne base station may comprise an implementation of the functionality of an eNb, evolved Node B node, in accordance with said communication system.

In accordance with a further aspect, a computer program comprising computer readable code means is provided, which when run on a computer, causes the computer to carry out the terminal device-based steps of the method according to aspects discussed above.

In accordance with another aspect, a computer program comprising computer readable code means is provided, which when run on a computer, causes the computer to carry out the base-station based steps of the method according to aspects discussed above.

In accordance with another aspect, a computer program product comprising a computer-readable medium is provided, on which the computer program discussed above is stored.

By using one or more of the methods discussed above, it becomes possible to use an airborne or spaceborne base station, such as for example an eNodeB type communication node implemented on a satellite, as an access point for a piece of user equipment having low available power. This enables for example to connect Internet of Things, IoT, devices to a global network, without requiring the construction of fixed cellular networking infrastructure. By using flight path information describing the airborne/spaceborne base station's trajectory, as well as an estimation of its own location, the user equipment device is able to estimate when the base station will be within its line of sight, so that in the meantime power may be saved. Once the base station is within the device's line of sight, the device may synchronize to the base station in terms of transmission delay and Doppler drift, and pre-emptively compensate any delay and/or drift in following up-link transmissions, thereby improving the efficiency of the communication between the user equipment and the base station. In accordance with aspects, an estimated Doppler shift and/or transmission delay, which is based on the available flight path information with respect to the user equipment's own location, may further be used when no measure of these values is available, or in order to refine any measured Doppler shift or transmission delay for a subsequent pre-compensated uplink transmission to the base station. By avoiding retransmissions due to loss of synchronization between the user equipment and the base station, this approach is able to save power on both the user equipment device and on the airborne/spaceborne base station, which as limited resources as well. In accordance with other aspects, in which a fleet of airborne or spaceborne base stations, comprising for example a constellation of interconnected satellites is available, a method of estimating the user equipment's own geographical location is further provided, which is useful if no other geolocation services are available.

BRIEF DESCRIPTION OF THE DRAWINGS

Several embodiments are illustrated by way of figures, which do not limit the scope of the invention, wherein.

DETAILED DESCRIPTION

This section describes aspects in further detail based on preferred embodiments and on the figures. The figures do not limit the scope. Unless otherwise stated, similar concepts are referenced by similar numerals across embodiments. For example, references 100, 200, 300 and 400 each refer to a non-terrestrial cellular data communication network, in accordance with a first, second third and fourth embodiment.

A set of functional and architectural modifications are proposed to enable cellular wireless technology to operate over non-terrestrial networks. The disclosed embodiments are related generally to the field of cellular wireless communications, in particularly for its operation over a constellation or a group of non-terrestrial base stations, including but not limited to drones, airplanes, High Altitude Platform Station, HAPS, and satellite systems.

By way of a non-limiting example, the 3GPP cellular standard is designed to operate using terrestrial networks.

In the of development any terrestrial standard, it is always assumed that the radio and core networks are never short of resources in terms of both processor capacity and power requirements. However, for such a standard to operate over non-terrestrial networks, in addition to power constraints and processor capacity limitations, the channel model, path-loss and other functional conditions for operations such as Doppler and propagation delay add to the complexity of the system design.

Therefore, the present disclosure offers solution to the problem by proposing a set of functional and architectural modifications to the system that will enable the successful and efficient operation of cellular wireless communication protocols over non-terrestrial networks. While the proposed methods may be useful on their own, they may also be combined with each other to provide an overall improved method enabling efficient communication in a non-terrestrial cellular data communication network.

Existing Communication Standards

The radio interface for 3GPP LTE/NB-IoT release 13 covers the interface between the User Equipment, UE, and the network. The corresponding standards document is publicly available for example from www.etsi.org at the following path: /deliver/etsi_ts/136100_136199/136104/ 13.04.00_60/ts_136104 v130400p.pdf, and its content is hereby incorporated by reference in its entirety. The radio interface is composed of the Layer 1, 2 and 3. The TS 36.200 series describes the Layer 1 (Physical Layer) specifications. Layers 2 and 3 are described in the 36.300 series.

Figure 1:
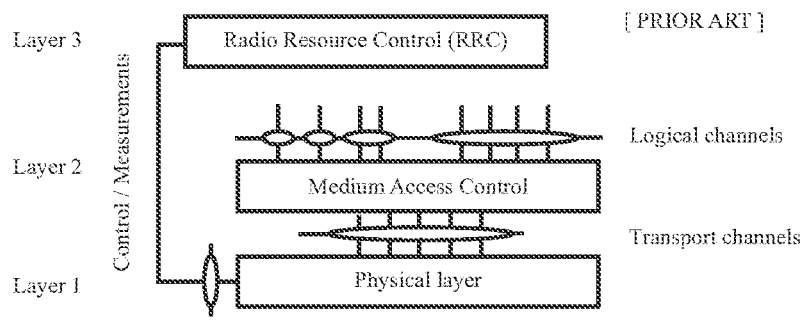
FIG. 1 illustrates a known radio interface protocol architecture.

FIG. 1 shows the E-UTRA radio interface protocol architecture around the physical layer (Layer 1). The physical layer interfaces the Medium Access Control, MAC, sub-layer of Layer 2 and the Radio Resource Control, RRC, Layer of Layer 3. The circles between different layer/sub-layers indicate Service Access Points, SAPs. The physical layer offers a transport channel to MAC. The transport channel is characterized by how the information is transferred over the radio interface. MAC offers different logical channels to the Radio Link Control, RLC, sub-layer of Layer 2. A logical channel is characterized by the type of information that is transferred, rather than physical characteristics of the channel.

Figure 2:
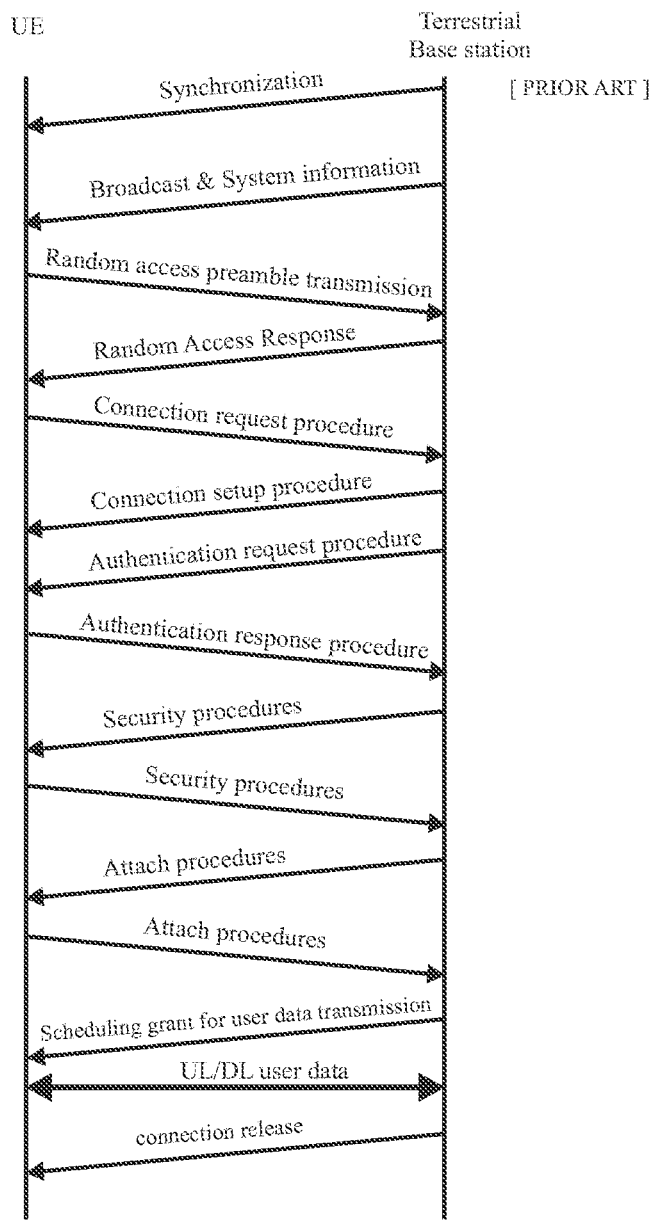
FIG. 2 illustrates a known protocol sequence between a terminal device and a ground based base station of a cellular LTE/NB-IoT network.
Figure 3:
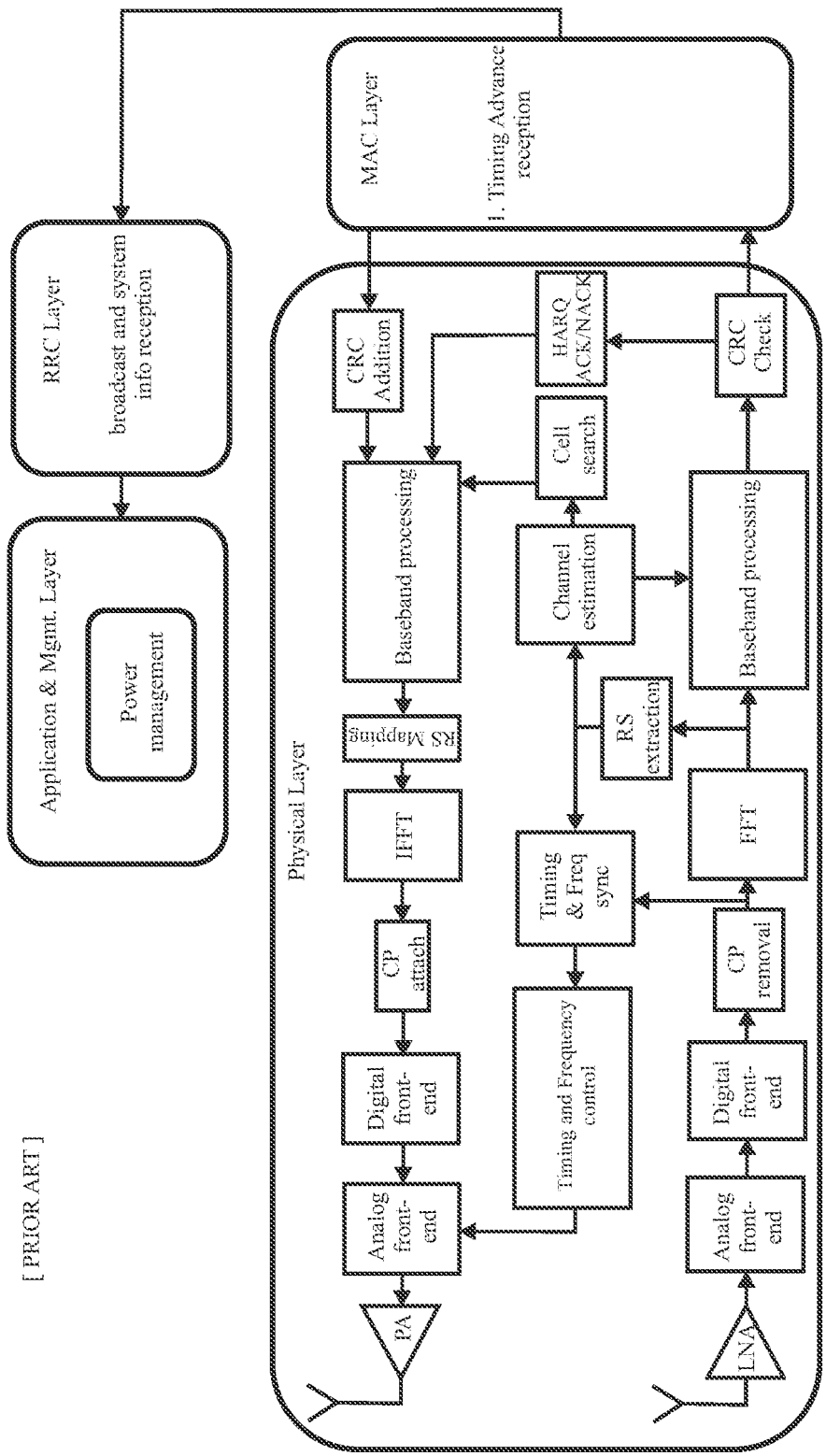
FIG. 3 illustrates a known functional device architecture of a terminal device of a cellular LTE/NB-IoT network.

The 3GPP 4G LTE/NB-IoT protocol sequence, as shown in FIG. 2, is broadly classified as:
1. Synchronization
2. Broadcast and system information transmission
3. Random Access
4. RRC Signalling
5. User data transmission
6. Connection release While this nomenclature is specific to the 4G standard, the principles are similar in all cellular protocols. The corresponding known device architecture that enables the connectivity is shown for reference in FIG. 3.

Generally an execution of a known positioning method, independent of the method being based on satellite or mobile radio signals, consist of three steps:
1. Providing initial assistance and information for position estimation.
2. Execution of certain measurements and reporting of measurement results.
3. Position estimation based on measurement results.

The supported positioning methods in cellular based positioning services rely on a high-level network architecture shown. For example, as one of the design goals for LTE/NB-IoT was to decentralize everything, the network architecture has been defined so that it is generally independent from the underlying network. There are three main elements involved in the process, the Location Service Client, LCS, the LCS Server, LS, and the LCS target. A client, i.e., the requesting service, is in the majority of the cases installed or available on the LCS target. This service obtains the location information by sending a request to the server. The location server is a physical or logical entity that collects measurements and other location information from the device and base station and assists the device with measurements and estimating its position. The server basically processes the request from the client and provides the client with the requested information and optionally with velocity information.

There are generally two different possibilities for how the device (client) can communicate with the location server. There is the option to do this over the user plane (U-Plane), using a standard data connection, or over the control plane (C-Plane). In the control plane the E-SMLC (Evolved Serving Mobile Location Center) is of relevance as location server, where for the user plane this is handled by the SUPL Location Platform. SUPL stands for Secure User Plane Location and is a general-purpose positioning protocol defined by the Open Mobile Alliance (OMA). Both E-SMLC and SLP are just logical entities and can be located in one physical server.

One such mechanism is the Observed Time Difference Of Arrival, OTDOA, technique. In this technique the UE uses a multilateration method to measure the time of arrivals, TOA, of a particular reference signal, the Positioning Reference Signal, PRS, from multiple base-stations. The UE uses one base station as the reference base station and subtracts the TOA of the PRS of it from the several neighbor base-stations.

Figure 4:
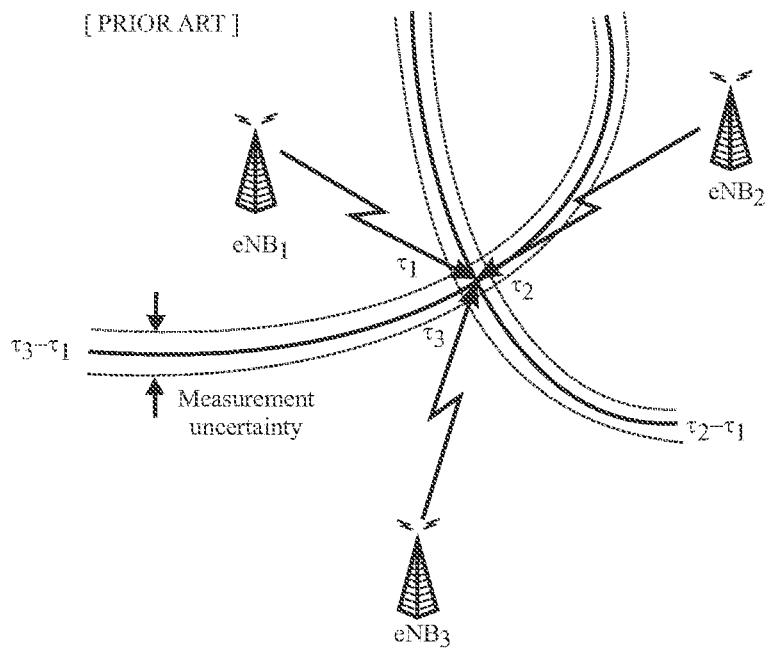
FIG. 4 illustrates a known TDOA positioning algorithm for terrestrial cellular networks.

Geometrically, each time (or range) difference determines a hyperbola, and the point at which the hyperbolas intersect is the desired UE location. This is illustrated in FIG. 4. At least three timing measurements from geographically dispersed base-stations with good geometry are needed to solve for two coordinates (x,y or latitude/longitude) of the UE.

Figure 5:
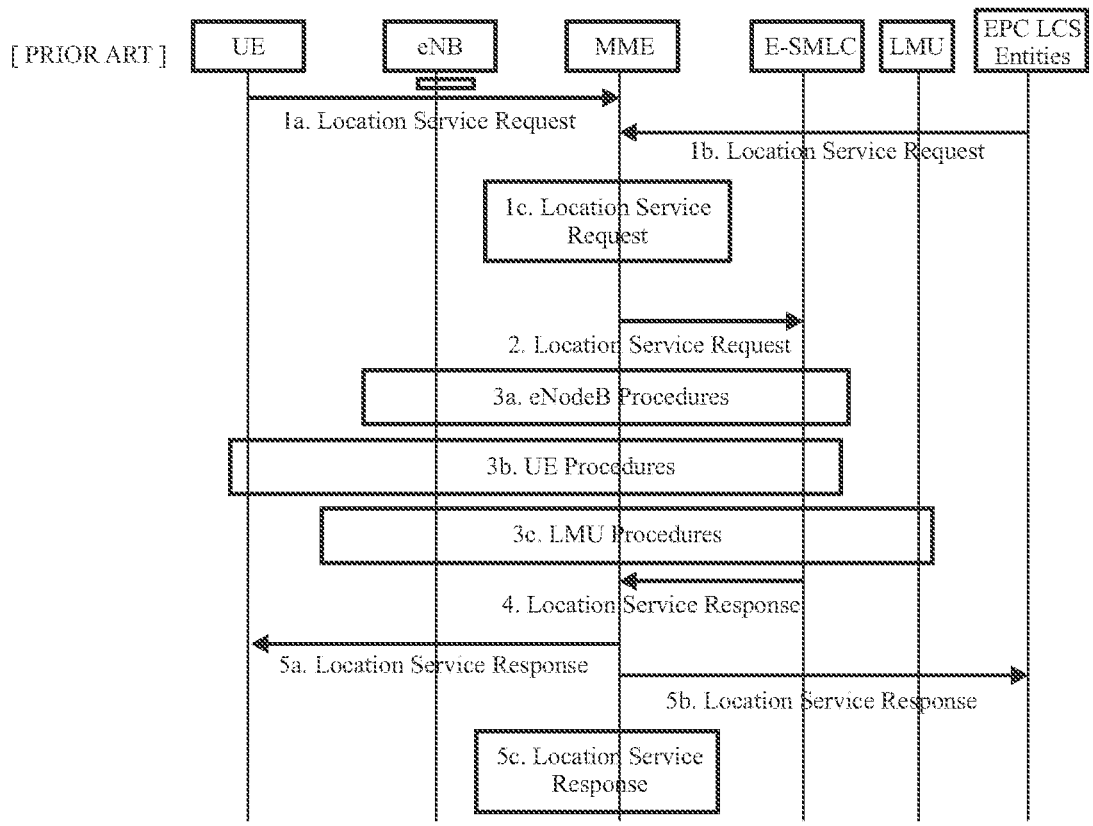
FIG. 5 illustrates a known location service procedure in a terrestrial cellular network.

For this, in case of LTE (Long Time Evolution), a set of procedures are followed in the LTE at a known protocol level which is illustrated in FIG. 5.

This is as follows:
1a. Either: the UE requests some location service (e.g. positioning or delivery of assistance data) to the serving MME at the NAS level.
1b. Or: some entity in the EPC (evolved packet core) (e.g. GMLC) requests some location service (e.g. positioning) for a target UE to the serving MME.
1c. Or: the serving MME for a target UE determines the need for some location service (e.g. to locate the UE for an emergency call).
2. The MME transfers the location service request to an E-SMLC.
3a. The E-SMLC instigates location procedures with the serving eNode B for the UE—e.g. to obtain positioning measurements or assistance data.
3b. In addition to step 3a or instead of step 3a, for downlink positioning the E-SMLC instigates location procedures with the UE—e.g. to obtain a location estimate or positioning measurements or to transfer location assistance data to the UE.
3c. For uplink positioning (e.g., UTDOA), in addition to performing step 3a, the E-SMLC instigates location procedures with multiple LMUs for the target UE—e.g. to obtain positioning measurements.
4. The E-SMLC provides a location service response to the MME and includes any needed results—e.g. success or failure indication and, if requested and obtained, a location estimate for the UE.
5a. If step 1a was performed, the MME returns a location service response to the UE and includes any needed results—e.g. a location estimate for the UE.
5b. If step 1b was performed, the MME returns a location service response to the EPC entity in step 1b and includes any needed results—e.g. a location estimate for the UE.
5c. If step 1c occurred, the MME uses the location service response received in step 4 to assist the service that triggered this in step 1c (e.g. may provide a location estimate associated with an emergency call to a GMLC).

As a part of the Location service response, the UEs location estimates are provided by the network.

This known architecture is not suitable for use with non-terrestrial networks for direct connectivity because:
1. The UE can be programmed only manually to wake up at specific times or wake up randomly to transmit. This is inefficient in terms of device power management for non-terrestrial use-case.
2. The current synchronization mechanism in the protocol cannot correct more than 7.5 KHz of Doppler inherently.
3. There is no transmission of location information of the base-station which would be necessary to predict the UE wake up time and possibly high Doppler estimation and correction.
4. The current protocol can handle timing offsets of less than 1 ms only (up to 266.67 μS for NB-IoT and 666.67 μS for LTE) which is equivalent to the cyclic prefix length of the OFDM and SCFDMA symbols used in the standard. This would be higher for non-terrestrial networks, especially for satellites.
5. For the cellular based location service, the UE needs to be in view of at least 3 base-stations, which may or may not be the scenario for non-terrestrial networks.

Proposed Method and Architecture

Figure 6:
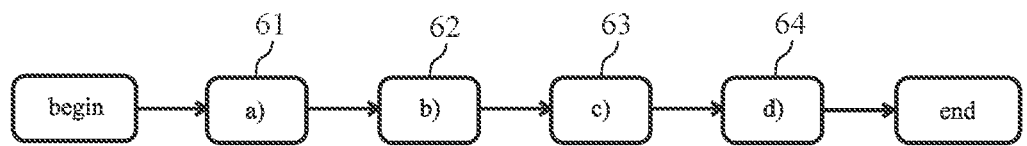
FIG. 6 illustrates the main steps of a method in accordance with a preferred embodiment.
Figure 7:
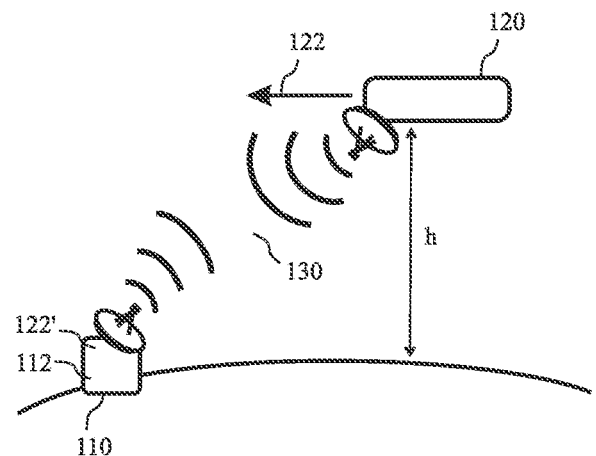
FIG. 7 illustrates a non-terrestrial cellular communication network in accordance with a preferred embodiment.

FIGS. 6 and 7 illustrate the main steps of a method in accordance with a preferred embodiment of the invention. In a non-terrestrial cellular data communication network 100, at least one airborne or space borne base station moves along a flight trajectory at a given altitude h above ground, wherein h may be in the range of a few to a few hundred kilometers. The method comprises the following main steps:

Step 61: a) providing flight trajectory data 122' for said base station 120, i.e. data describing the flight trajectory 122 of the base station 120, in a memory element of a ground based terminal device 110;

Step 62: b) providing terminal location data 112 in a memory element of said terminal device 110; the terminal location data comprises an indication of the terminal device's position on the ground, i.e. in absolute coordinates. This indication may be obtained by any suitable geo-positioning means, including but not limited to a satellite based geo-positioning system.

Step 63: c) using a data processing unit, determining at least one time slot during which a wireless communication channel 130 between said terminal device 110 and said base station 120 is estimated to be available, based on said flight trajectory data 122 and on said terminal location data 112; Based on the flight trajectory data 122, the processing unit may for example extrapolate the data so as to compute estimated future positions, velocities etc. of the base station. Further, a channel may be estimated to be available if the elevation of the base station 120, as observable from the terminal device 110, is above a given and predetermined threshold value.

Step 64: d) using a data processing unit, scheduling a data reception or transmission between said terminal device and said base station during the determined time slot.

The method corresponds to a non-terrestrial cellular network cognitive method for waking-up the terminal device, which thereby reduces its power consumption. Further details of several embodiments are described here below.

FIG. 7 illustrates an embodiment of a non-terrestrial cellular system 100 may be understood to include a global or local constellation or group of non-terrestrial flying objects 120 such as airplanes, drones, HAPS and/or satellites that may be located at a distance of a few km above the earth's surface up to Low Earth Orbit, LEO, Medium Earth Orbit, MEO, or Geostationary Orbit, GEO. Each of these flying objects ideally hosts a regenerative payload, capable of running a complete base-station+Core network solution, and other allied subsystems. The entire system of a non-terrestrial cellular network composes for example of a multitude of such non-terrestrial payloads, earth station gateways, GW, non-terrestrial radio access network, NT-RAN, data centers, non-terrestrial mobile network operators, SMNO, and non-terrestrial mobile or fixed user equipment(s), UE.

Each non-terrestrial object or base station 120 in the fleet or constellation flies a payload (along with other necessary sub-systems such as the Telemetry, Tracking & Control subsystem, power subsystem, thermal control subsystem, Attitude determination and Control subsystem, on-board computer, etc.) that is a complete network in a box solution based on software defined radio architecture, SDR.

Each of these payloads may comprise a Base Transceiver System, possibly with additional Core network functionality (such as MME, S-GW, AUTH, etc., as named in the 3GPP 4G LTE/NB-IoT standard or its equivalent to 2G, 3G or 5G standards of 3GPP) depending on the architecture. The payload can run all the layers (PHY, MAC, RLC, PDCP, RRC/IP) of the 3GPP cellular protocol stack with and without modifications for both non-terrestrial and terrestrial use cases. These aspects are known in the art as such and their function will not be described to any detail in the context of this description. The description focuses on the concepts that are most relevant for understanding the present disclosure.

In cellular 4G LTE/NB-IoT, for example, an eNB is a controller of a group of cells. A typical cell site will have a single eNB controlling 3 sectors (or cells) with a single 51 link back to the Evolved Packet Core, EPC. This is a convenient level of abstraction as it allows a single centralized processing system coupled with many remote radio heads, RRH, to implement the sectors. If all the scheduling is performed in one location, then this enables spontaneous interference mitigations schemes without having to exchange information with distant nodes (and the inherent delays involved in backhauling these messages).

The non-terrestrial cellular system 100 extends this principle in that a single base-station 129 controls many cells and these are implemented as 'softly' as possible to allow flexibility and scalability. In 3GPP LTE/NB-IoT, the maximum number of cells that an eNB can control is 256, due to the cell id being an 8-bit quantity. It is assumed that this will be sufficient for the non-terrestrial cellular application.

Figure 8:
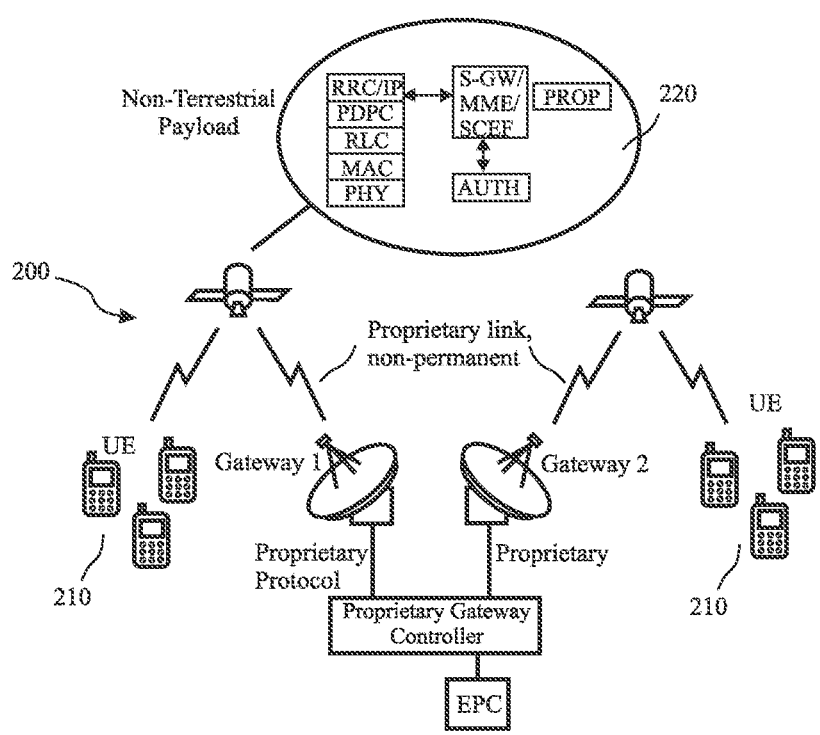
FIG. 8 illustrates a store and forward architecture for a non-terrestrial cellular communication network.
Figure 9:
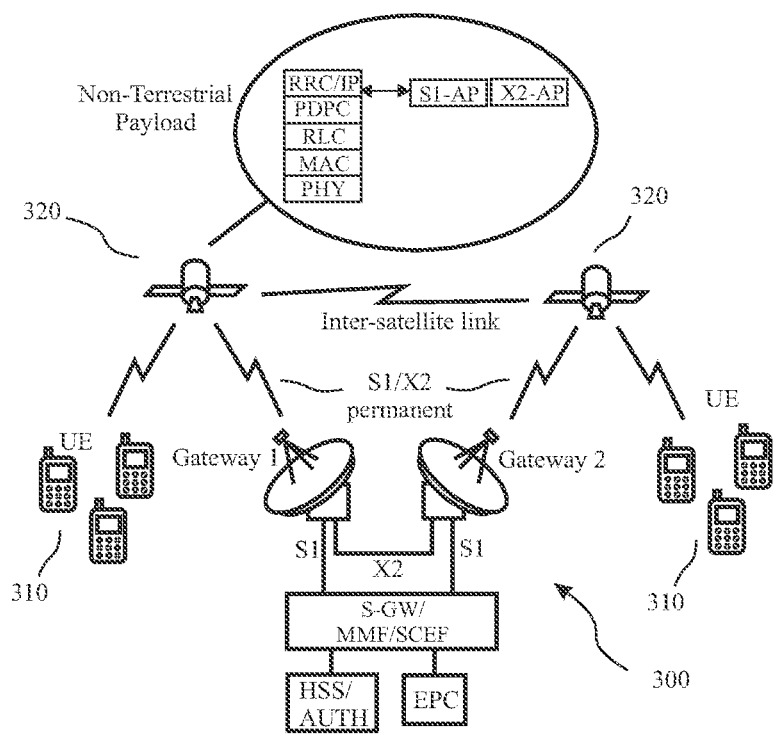
FIG. 9 illustrates a real-time non-terrestrial cellular communication network with inter-satellite link.
Figure 10:
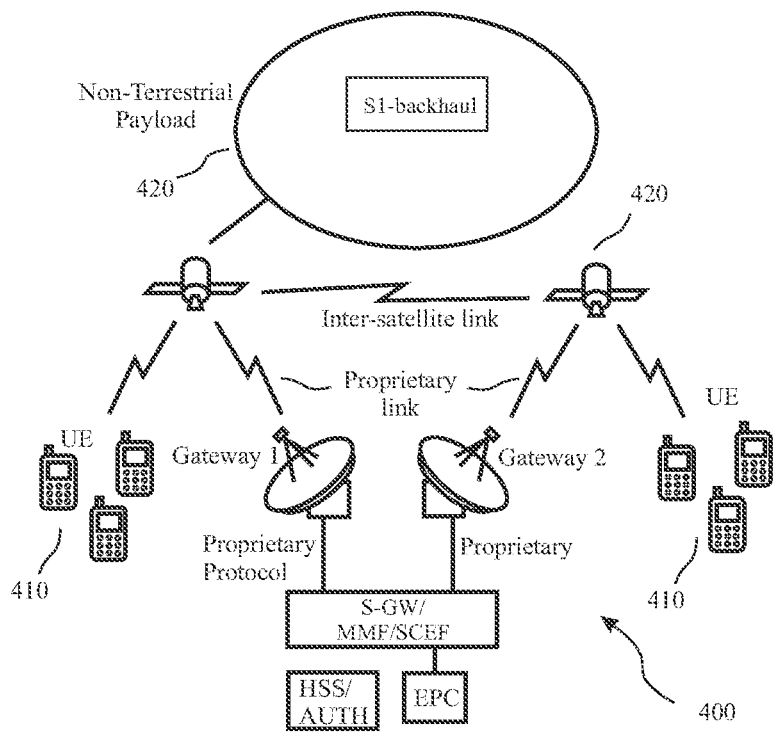
FIG. 10 illustrates a femtocell architecture for a non-terrestrial cellular communication network.

The system architecture in which the methods are put to use may be implemented in one of the three ways as shown in FIGS. 8-10.

FIG. 8 is the Store-and-forward architecture of a non-terrestrial cellular network 200. If the link with the Gateway is not permanent and the link between the base-station 220 and the core network (S1 interface as it is called in the 3GPP 4G standard or its equivalent for other standards such as 2G, 3G or 5G) is not always available, then some of the core network functionalities must be incorporated into each non-terrestrial payload 220 to compensate for the lack of connectivity with the gateway. Here, elements such as the Packet Data Network Gateway (PDN-GW; Serving-GW/Packet-GW as called in the 4G standard) and authentication centre must be localized in the non-terrestrial payload and updated via some Operation and Maintenance, OAM, procedure. Similarly, any user data must be queued in the non-terrestrial base station 220 and exchanged with the Gateway when the ground link is available. This is the store and forward architecture.

Each non-terrestrial payload effectively acts as a base-station 220 and core network component and the system is scalable by adding new payloads, just like a terrestrial network would add a new base station. Scalability is also achievable by increasing the available bandwidth for operation.

The link with the Gateway is proprietary (could be with the TT&C Link for the satellites or equivalent technology for other platforms) and must provide the following functionality: the link must be Bi-directional. It can be off the shelf such as a point to point microwave link. The transport layer can be based on any reliable transport technology, such as IP. A simple protocol to transfer stored user datagrams between the non-terrestrial payload and the underlying core network connection (presumed to be IP). An OAM (Operations, Administrations, Management) protocol for maintenance of the software entities in the non-terrestrial context. One example of this is the add/modify/delete subscriber records in the Home Subscriber Service, HSS, so that authentication and admission of users can be performed even when the link with core network is unavailable.

In this case, the additional inter-payload links (X2 interface as called in the 4G LTE/NB-IoT standard) shall enable the interface between multiple non-terrestrial base-stations to achieve real time operations. For example, this could be via inter-satellite links for payloads hosted on satellites.

FIG. 9 is the alternative architecture of a non-terrestrial cellular network 300 with permanent S1 interface. If S1 is always available and reliable, then the IP gateway and the core network are located on the ground and may be shared between all non-terrestrial base-stations 320. This is the preferred architecture for higher scalability as each non-terrestrial payload acts just as base-station and there is a central core network. The link with the Gateway is standardized and may be implemented in terms of any off the shelf point to point link over IP. However, this requires high complexity as inter-satellite links and greater ground station coverage to guarantee continuous visibility are required.

The X2 interface is an optional 3GPP 4G interface that allows eNBs 320 to communicate directly with each other in near real-time. It is used in LTE to enable features such as data forwarding of RRC contexts during handover, interference coordination and load balancing and is included here for completeness. If S1 is a permanent interface, then X2 will be available too as is can use the same transport layer. In cellular NB-IoT X2 is also used to transfer RRC Contexts between eNBs in the user plane optimization scheme. In terrestrial networks, all base stations are stationary. This means, the X2 interface of a base-station is defined with respect to its fixed neighbour base-stations for information exchange between base-stations within the same core network.

However, in a non-terrestrial cellular data network, the base-stations are moving and dynamic in their trajectories. From a constellation perspective, this means the set of neighbours of a base-station is not fixed, but changing. Therefore, each base-station preferably uses its own location and trajectory information, and the information of location and trajectory of the other base-stations in the constellation/fleet (which may be, upon expiry, constantly refreshed by the core-network) to constantly update its neighbours and the respective definitions of the X2 interface with these updated neighbouring base-stations.

In case of terrestrial networks, this X2 interface is established by microwave, optical or other reliable links. In non-terrestrial network, NTN, this may be established through the inter-base station link, in case of satellites it is the inter-satellite link.

FIG. 10 is an alternative femto-cell architecture for a non-terrestrial cellular communication network 400. It has been proposed that instead of using a cellular link directly as the link between non-terrestrial platform 420 and UEs, then a network of ground-based cellular aggregators/gateways (as called femtocells in 4G standards) are deployed and they are backhauled via non-terrestrial payloads instead.

Femtocells can be deployed within buildings for in-building coverage. Femtocells can act as concentrators for groups of cellular terminals, instead of trying to connect each terminal directly to a non-terrestrial constellation. The shorter radio links between terminals and femtocells will enable better coverage (or deployment in more hostile radio environments). Femtocells feature extensive radio resource management algorithms for ad-hoc deployments.

If the frequency available for non-terrestrial backhaul is still used, then the femtocell antenna 410 will still need to be in Line of Sight, LOS, with the non-terrestrial payload 420 which implies the need for feeders and custom installation. The femtocell could operate on frequencies more suitable for in-building coverage. If licensed bands are used, then clearly an operating license will be required, and this will vary between territories.

To backhaul the core network interface from the femtocells to the non-terrestrial payload a new real-time, high availability radio access scheme is required for this link. A 4G/5G relay could be an option but is subject to similar technical restrictions in the physical layer.

Femtocells will need a permanent power supply, as the power amplifier will need to be permanently operating to generate the downlink control channels for UE synchronization. The technology can be implemented in both licensed and unlicensed frequency bands.

In order to accommodate non-IP data delivery for store and forward architecture FIGS. 8-10, Service Capability Exposure Function, SCEF, components shall be a part of the EPC of the non-terrestrial cellular system. This connection between the SCEF and the application servers is, on a terrestrial cellular network, a permanent connection.

It is proposed that the SCEF (Service Capability Exposure Function) functions be modified to accommodate for, but not limited to the functions of, buffering of non-IP user data in SCEF from multiple users, mimicking the connection between SCEF and Application Servers on the ground station in the absence of an intersatellite (inter base-station) link. In the presence of an available link the link between the SCEF and the application servers may be made permanent and implemented as recommended by the 3GPP cellular standard.

The non-terrestrial airborne or spaceborne base-station 120, 220, 320, 420 may have single or multiple spot beams in the uplink and downlink to divide the radio and processing overhead spatially and provide methods of frequency reuse. The actual design of the non-terrestrial beam should take into consideration to be as flexible as possible in the MAC and PHY design. The beams can cover same cell area or different cell areas. This is valid for both Frequency Division Duplexing, FDD, and Time Division Duplexing, TDD, operations of the non-terrestrial cellular system. The system may have single-carrier or multi-carrier capabilities and use different modulation techniques such as GMSK, QPSK, QAM, etc., or any equivalent variants of these schemes. The access scheme may be TDMA, CDMA, FDMA, OFDM, OFDMA etc., or any other equivalent schemes. The higher layers of the protocol may or may not be agnostic to the duplexing scheme employed in the payload and UE operation of the non-terrestrial cellular system.

Transmission of Flight Trajectory Data

One novel addition to such a system to enable non-terrestrial deployment would be the introduction of the continuous or periodic transmission of an enriched dataset by the airborne or spaceborne base-station 120, 220, 320, 420. For example, the Two-Line Element, TLE, for satellites or equivalent for other non-terrestrial base-station embodiments related to its path information on the downlink of the cellular protocol as a part of its broadcast of system information.

This data set 122' may be used by the respective terminal devices 110, 210, 310, 410 such as UEs/gateways in combination with their knowledge of their own location 112 to predict the state of the base-station 110, 210, 310, 410 such as its position and possibly velocity, Doppler and delay, etc., using a suitable propagator algorithm (such as the SGP4 available at help.agi.com at the following path: /stk/index-.htm #stk/vehSat_orbitProp_msgp4.htm propagator for satellites and equivalent propagators for other embodiments of non-terrestrial base-stations) or a definite period in the future with a valid accuracy. This computed information may further be used by the UEs/Gateways 110, 210, 310, 410 to wake-up, synchronize, perform Doppler and delay pre-compensation and attach themselves to the network 100, 200, 300, 400.

Figure 11:
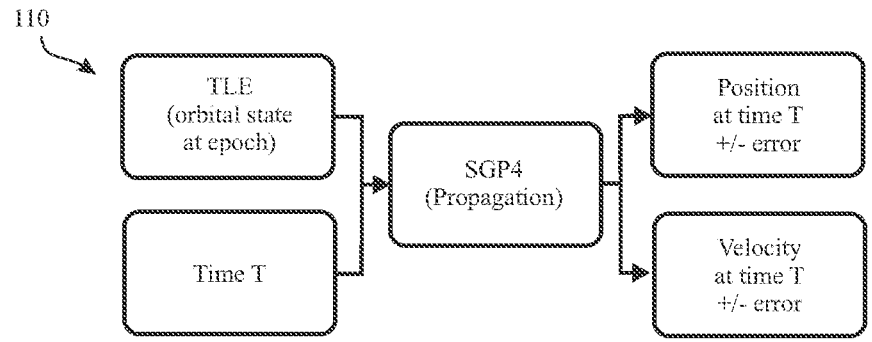
FIG. 11 illustrates the main steps of an algorithm for propagating flight trajectory data in time.

This information of the UE location and the base station location is used by the propagator (in this example an SGP4 propagator) to estimate the UE wake-up times and Doppler and delay prediction at the application and management layer. The input of SGP4 algorithm, shown in FIG. 11, is a Two-Line Elements (TLE) produced by NORAD. The TLE is a description of the current orbital elements of a satellite. From the TLE, the SGP4 algorithm can calculate the inertial orbital state vectors of a satellite at any point T in the future (or the past) to some accuracy. The raw outputs of the SGP4 are the position and the velocity vector of the satellite in an inertial reference frame (ECI) called True equator, Mean equinox (TEME).

The TLE in this example is a data format encoding the mean orbital parameters of a satellite for a given point of time. Here is an example in its standard format:
1 43132U 18004x19215.41404522 0.00000829 00000-0 37553-4 0 9992
2 43132 97.4860 283.1384 0011471 94.2701 265.9847 15.23639096 86464

The first line includes the following elements from left to right:
Line number
Satellite number
International designator
Epoch year & Julian day fraction
1st derivative of mean motion or ballistic coefficient
2nd derivative of mean motion, usually blank
Drag term or radiation pressure coefficient
Ephemeris type
Element number & check sum
The second line include the following elements from left to right:
Line number
Satellite number
Inclination
Right ascension of the ascending node
Eccentricity
Argument of perigee
Mean anomaly
Mean motion
Revolution number & check sum This standard format can be customized to the specific needs of the application.

By knowing the position and velocity of the base station and the user terminal, it is possible to calculate when the user terminal needs to wake up but also the Doppler shift and the propagation delay at any point T in the future to some accuracy.

Figure 12:
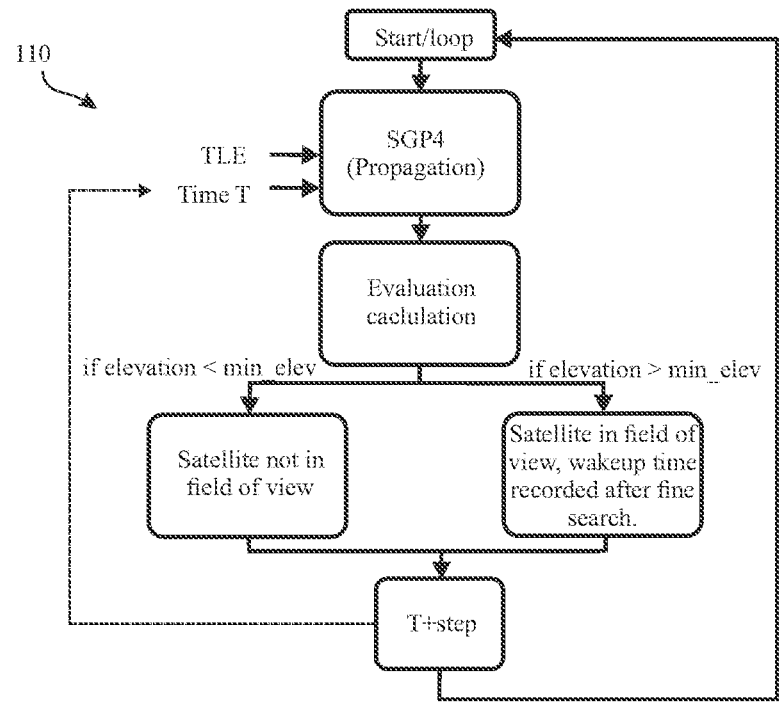
FIG. 12 illustrates the main steps of an algorithm for predicting wake-up times of a terminal device, in accordance with a preferred embodiment.

A way to predict the wake-up times is to calculate the elevation of the base stations above each user terminal. The user terminal shall wake up when the elevation of a base station is higher than a predefined threshold (min_elev in the flowchart shown in FIG. 12).

A way to decrease the resources needed to compute the wake-up table is to use a dynamic step instead of a fixed one. Several techniques can be used like increasing the step size after the elevation of the satellite is higher than the minimum elevation required to have a successful connectivity. The step size can also be increased or decreased in function of the distance between the base station and the user terminal. The step size can also be changed in function of the derivative in time of the distance between the base station and the user terminal, as long as the base station is going away of the user terminal, the step size can be big while when the distance is reducing and closer than a threshold, the step size should be small to avoid to miss a base station in the field of view.

The dataset 122' of each base-station 120 may preferably have an expiry period. For example, the TLE includes mean orbital elements and to compensate varying over time non-conservative forces that impact the satellite orbit like the atmospheric drag or the solar radiation, it must be updated regularly. This means that the dataset 122' must be updated on a regular basis for the UE 110 to be able to make accurate predictions. The TLE updates can be transmitted by each base station (in case of a satellite constellation, by each satellite) as a part of the broadcast and system information continuously or periodically (for example, in case of LTE/NB-IoT, the System Information Block-16 (SIB16) which is an RRC message.) This is received by the UE from all the non-terrestrial base stations 120 and regularly updated before the expiry of the current dataset. Alternatively, if a fleet or constellation of airborne/spaceborne base station is used, one base station may transmit, preferably via broadcast, a dataset 122' relating to a plurality of base stations, preferably of all base stations, within the fleet or constellation.

The UE wake-up times are either scheduled by application and management layer either for scheduled transmission or to update its data-set almanac in a storage or memory element.

Figure 13:
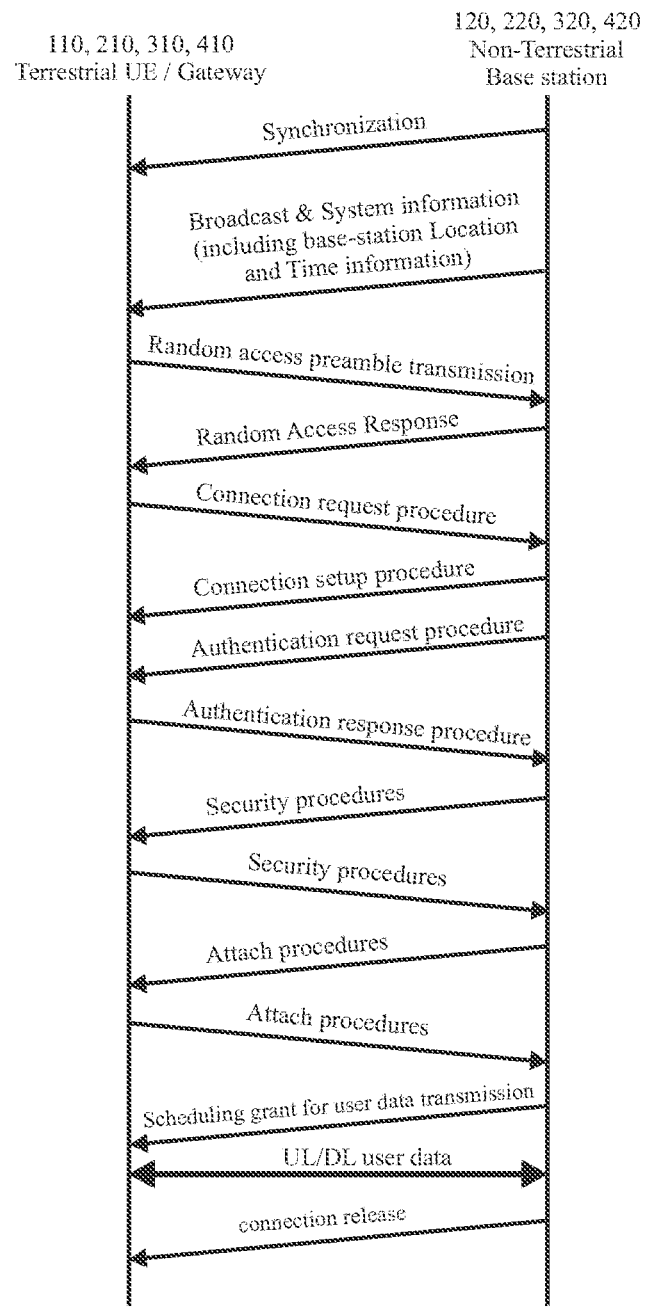
FIG. 13 illustrates a protocol sequence for a non-terrestrial cellular communication network, in accordance with a preferred embodiment.

For the cellular protocol to work over a non-terrestrial scenario, the known protocol sequence as shown in FIG. 2 is therefore modified in-order to transmit the base-station location information (for example satellite TLE information via the SIB 16 of the NB-IoT/LTE protocol) which shall be used by the UE for wake up and advantageously also for offset prediction and pre-compensation as shown in FIG. 13.

Figure 14:
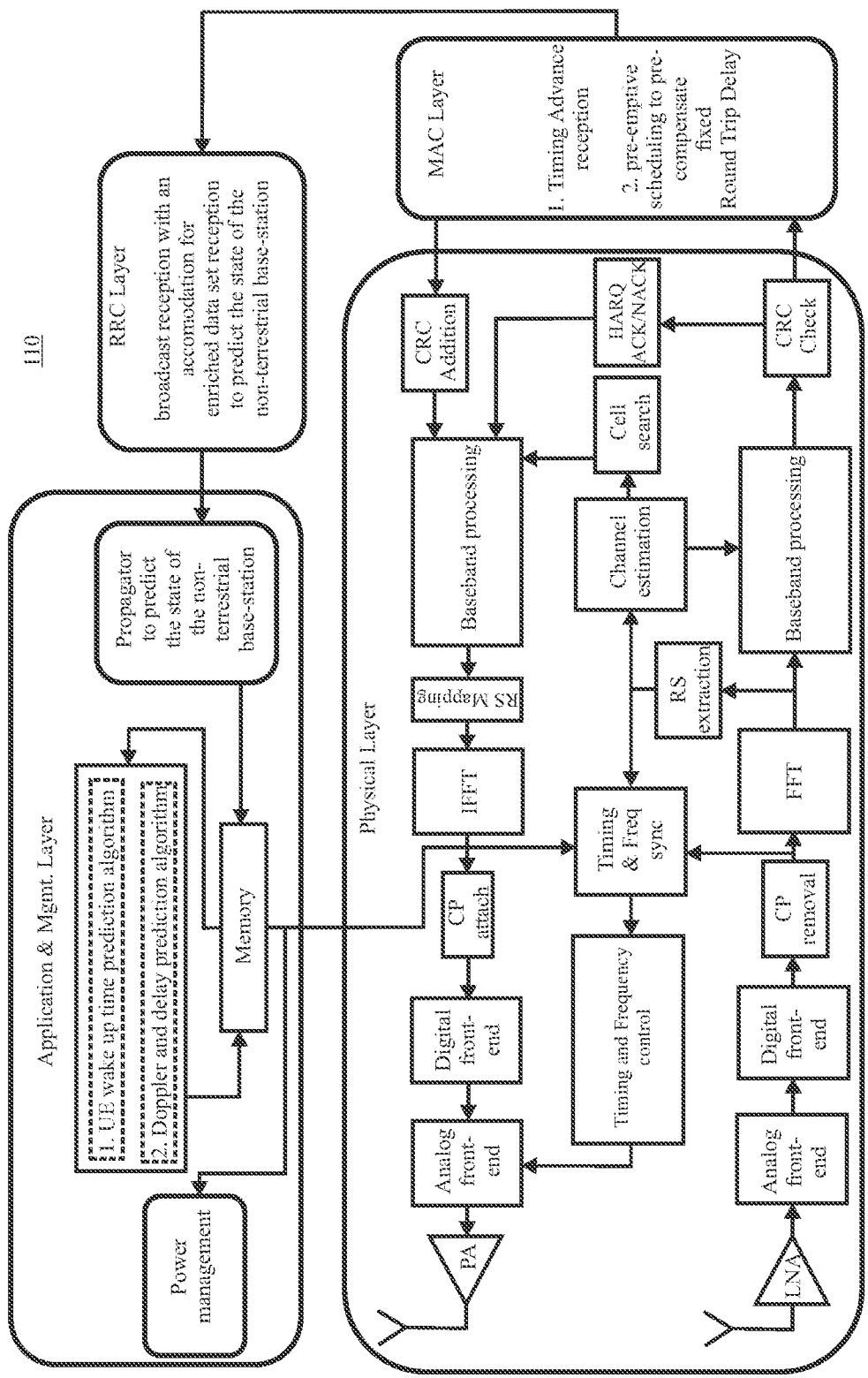
FIG. 14 illustrates a function architecture for a terminal device in a non-terrestrial cellular communication network, in accordance with a preferred embodiment.
Figure 15:
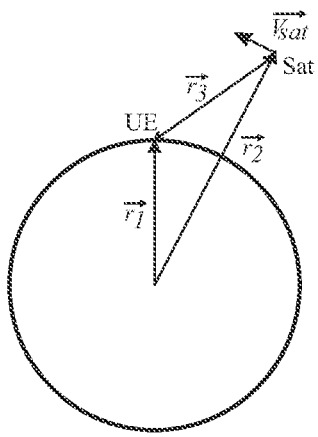
FIG. 15 illustrates a spaceborne base station and a terminal device of a non-terrestrial cellular communication network, in accordance with a preferred embodiment.

At the terminal device 110 (UE, GW) level, the following functionalities are added to the existing architecture as shown in FIG. 14:
1. Reception of base-station location information (for example, TLE for satellites or equivalent for HAPS, drones and airplanes)
2. A propagator to predict to predict future visibilities of the non-terrestrial base-station for UE wake up, Doppler and delay prediction
3. feedback of predicted Doppler and delay to pre-compensate UE transmissions
4. Preemptive scheduling at the MAC layer to compensate the fixed round trip delay None of the currently known cellular network technologies provide this feature, as it was not necessary for terrestrial deployments. This is because in terrestrial deployments the base-stations are fixed and immovable as envisaged by the state of art. But for non-terrestrial networks the inclusion of this information as a part of its downlink transmission, enable the UEs/gateways to optimize their power saving mechanisms by scheduling their wake-up procedures, optimize their synchronization, and enable Doppler and delay (caused by the high velocity and high altitude scenarios of the non-terrestrial network deployment scenarios) estimation, correction and pre-compensations for their corresponding uplink transmissions.

Estimation of the Location of a Terminal Device

A ground based terminal device 110 or UE may know its location due to its fixed nature, or from GPS/GNSS or an equivalent positioning system, or it is able to triangulate itself. If the UE does not know its own location, it shall be able to triangulate itself using cellular based location services such as the use of downlink observed time difference of arrival, OTDOA, or uplink time difference of arrival, UTDOA, Enhanced cell-ID as mentioned in the 3GPP cellular standards or other equivalent techniques assisted by multiple non-terrestrial base-stations over a single pass or over multiple passes.

If the UE's location is unknown and does not have a positioning device as a part of its architecture, it may initiate a cellular based location procedure. While other positioning algorithms may be used, the following procedure is provided by way of example. It allows the network to triangulate the UE's 110 location and report back to the UE a location estimate 112. For this, the UE first performs a random wake-up and blind acquisition of the carrier that is made available by the airborne/spaceborne cellular base station, and uses offset estimates of the most recent downlink to pre-compensate its uplink transmissions to attach itself to the network. Once it attaches successfully to the network via one of the base-stations, it shall initiate the location procedure. This may be done instantaneously if there are at least 4 non-terrestrial base stations simultaneously visible to the UE or over multiple passes if at least 2 such non-terrestrial base stations are visible to the UE at any given time.

If the UE 110 does not have knowledge of its own location (FIG. 16, step 1000, where NTN denotes the non-terrestrial network, i.e. airborne/spaceborne base station) by its fixed nature or through a positioning device such as GPS/GNSS, it shall wake up at random times to initially acquire a carrier that is made available by the airborne/spaceborne base station, and synchronize itself to the network. This may be done by standard synchronization procedures of the 3GPP standard, for example. However, if the actual frequency error between the base-station and the UE can be larger than the prescribed detection window then the UE must perform several passes at detection, either by re-tuning its reference oscillator according to some raster scheme or by pre-rotating received samples to simulate a change in downlink carrier frequency. Hence, by taking multiple passes and frequency-binning the results the feasible downlink frequency space can be searched effectively.

For example, with a LEO satellite constellation for NB-IoT service, assuming a hypothetical maximum Doppler error of 135 KHz is encountered when the satellites are at a low elevation. In this case, by way of example:

- The UE should perform many frequency-binned searches according to some raster scheme. Even if the NPSS/NSSS detection window is as large as 5 kHz, then this is 135/5=27 searches on a 5 kHz raster to cover just one potential downlink frequency from a satellite. If the UE has no prior knowledge of which frequencies are in use, then the entire downlink frequency band must be scanned exhaustively to acquire the system. This will very lengthy and cause a severe drain on resources for battery powered devices.
- The maximum Doppler frequency error of 135 kHz is ambiguous on the EUTRA carrier frequency allocation scheme, which uses a 100 kHz raster. If NPSS/NSSS are detected do they belong to carrier N, N−1 or N+1 in the presence of worst-case Doppler error? Clearly, this can be resolved by the UE observing the frequency change in NPSS/NSS over a predetermined period to see if it converges (as the satellite approaches the zenith) or by encoding the actual downlink frequency EARFCN somewhere in the system information, but this is a non-standard extension that must be added to the UEs search procedure such as modifying the raster window.

Figure 17A:
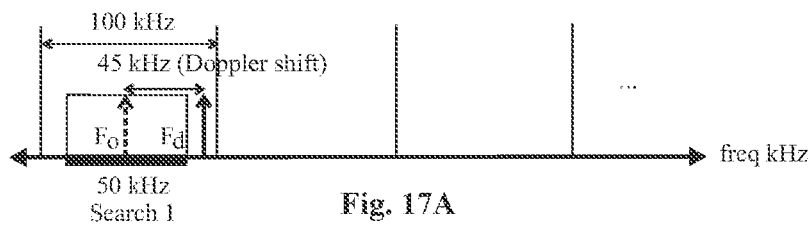
FIG. 17A illustrates a known frequency raster search method.
Figure 17B:
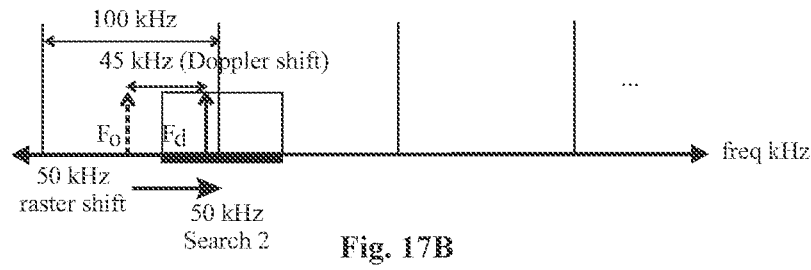
FIG. 17B illustrates a frequency raster search method in accordance with a preferred embodiment.

For example, the channel raster in standard terrestrial NB-IoT is 100 KHz. This means that the receiver's search window can only scan and detect 100 KHz bandwidth at a time and then it moves to the next search window of 100 KHz if it doesn't find any operating carrier frequency. First, consider the elevation angle of 70°. In order to capture all Doppler shifts, we propose a reduced channel raster of less than 100 Khz, and specifically for example 50 KHz at 70° elevation angle, without limiting to this raster size. Using 70 KHz detection window and 50 KHz raster search will be able to detect carriers shifted by any Dopplers. The working of 50 KHz raster is illustrated in FIGS. 17A and 17B. The figures illustrate the expected frequency FO, as indicated for example by a synchronization signal received from the base station, and the actual frequency Fd, at which the signal was indeed received, caused by a Doppler shift. FIG. 17A shows the 1st raster search in which a Doppler of 45 KHz for example is missed because it falls outside the range of detection window (which is +/−35 KHz). In the 2nd search, illustrated by FIG. 17B, the channel raster is shifted by 50 KHz instead of 100 KHz. Hence, the carrier is detected here. In the same way, higher Doppler shifts can also be detected with subsequent searches.

Once this is successful, the UE/gateway 110 may request a location service from the network via the airborne/spaceborne base-station 120 that is within this terminal device's line of sight. Once the network 100, via its core services, provides back the assistance data, the UE/Gateway can perform, and report back the RSTD measurements. This shall be used by the network to provide back a location estimate 112 to the UE/gateway.

Figure 16:
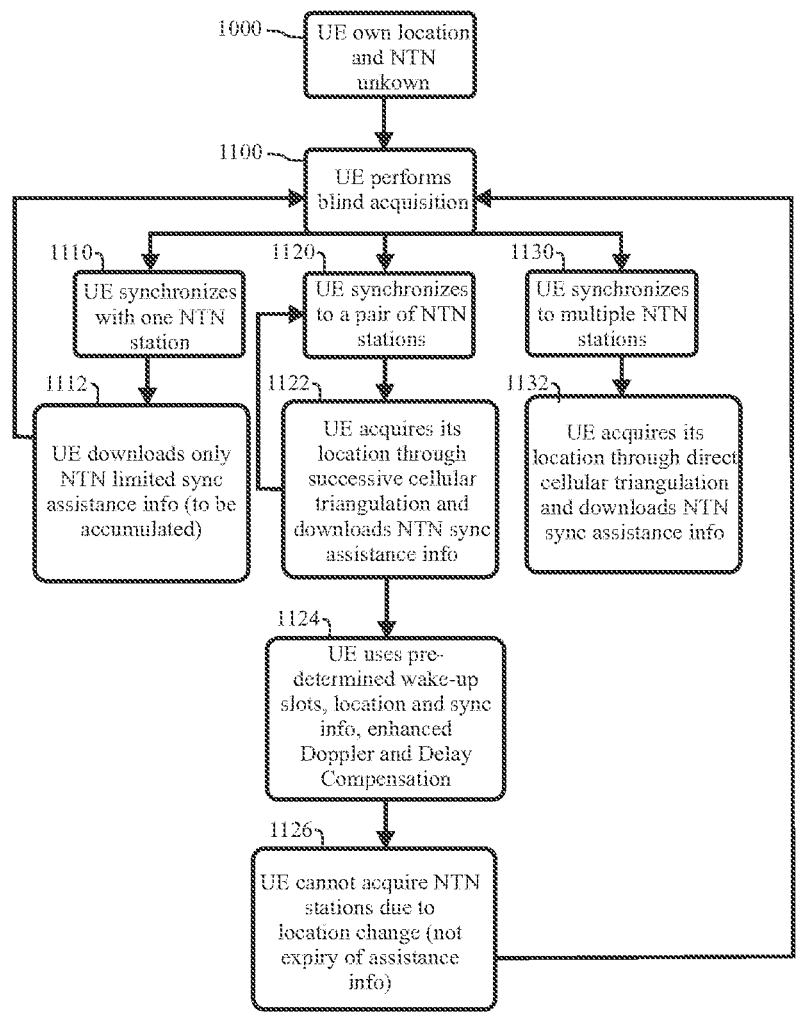
FIG. 16 illustrates the operation of a terminal device, when its location is known, in accordance with a preferred embodiment.

With reference to FIG. 16, the proposed method may therefore be summarized as follows. At step 1100, the terminal device performs a blind acquisition of the signal carrier provided by one of the base stations. If it synchronizes with one base station (1100), it may then at step 1112 download only limited synchronization assistance information from that base station. This is iterated to accumulate synchronization assistance information over time. If at step 1100 it synchronizes to a pair of base stations, it then acquires its location through successive cellular triangulation and downloads synchronization assistance information from the base stations at step 1122. Then the terminal device may use pre-determined wake-up slots, location and synchronization information, as well as Doppler and delay compensation at step 1124. If the terminal device loses the channel provided by the bases station due to a location change at step 1126, it goes back to step 1100. If after step 1100 the base station succeeds with synchronizing with multiple base stations at step at step 1130, it proceeds to step 1132 according to which it may acquire its location through direct cellular triangulation, and it may download base station synchronization assistance information.

It is to be noted that now, for a non-terrestrial network, it may or may not be possible for the UE to have view of 4 airborne or spaceborne base stations at all times. Therefore, a modified measurement procedure is proposed. In this case, only one or two base-stations are required to be in view of the terminal device, be it a user equipment or a gateway. The UE/Gateway shall initiate a location service request when its location is unknown to one of the visible airborne/spaceborne base-stations, which shall be used as the reference base station. This request is forwarded to the location server in the network through the inter-base station link. The core network will direct all the base stations that are expected to be visible to the UE to prepare preemptively the location assistance data to be transmitted to the UE when they are visible, this is because the core network knows the paths, trajectories and instantaneous location of each airborne/spaceborne base station within the non-terrestrial cellular network.

If only one airborne or spaceborne base station is available to the terminal device at any time, the fact that the base station's position with respect to the terminal device constantly evolves along the base station's trajectory may preferably be used to accumulate multiple measurements of the positioning reference signal, PRS, having been transmitted from said same base station, but at different positions along its trajectory, and at correspondingly different time instants.

If a pair of base stations is visible to the terminal device, the latter makes a first set of measurements of the positioning reference signals, PRS, for the pair of visible base-stations and stores the result in a memory element. Once the next two base-stations are in view, at a later time, the UE makes the second set of measurements and so on. In such a fashion the UE/gateway may accumulate multiple sets of reference signal time difference, RSTD, measurement for the purpose of 3-dimensional accuracy (at least 3 sets of RSTD measurements) over consecutive passes and report them back to the core network.

Similarly, if 3 or more base stations are visible at the same time these measurements can be performed simultaneously and in real time and reported back to the core network. The core network now uses these information sets to compute and provide back a location estimate to the UE via the next visible base station to the UE/gateway. The location server at the core network will assume the original locations of the base-stations at the time when the respective PRS signals were sent, even if the location has changed due to the continued motion of the base-stations.

The UE/gateway 110 may use this location estimate 112 as its own location in combination with the received TLE 122' of the satellites and update its wake-up schedules, further carrier search, synchronization procedures, Doppler and delay estimation and pre-compensations.

Time and Frequency Synchronization

System operation, in a non-terrestrial scenario, i.e. the communication between a ground based terminal device 110 (user equipment or gateway) and an airborne/spaceborne cellular base station 120, has to deal with frequency and time errors in order to acquire, synchronize and establish connectivity.

The frequency error $f_{err}$ in the system can be caused by primarily:
1. Doppler shift $f_d$ over the pass due to non-terrestrial movement of the base-station 120
2. Crystal offset error of the local oscillator $f_{LO}$
3. Drift in the Doppler shift due to the scheduling latencies In the context of the present description, the Doppler shift and the Doppler drift (derivative of the Doppler shift in time) are characterized by their normalized values. Using normalized values keeps the values independent of the carrier frequency used. The normalized Doppler shift is the Doppler shift divided by its carrier frequency. The normalized Doppler drift is the Doppler drift divided by its carrier frequency.

Assuming for example an overhead pass of a satellite base-station 120 in the LEO orbit at 600 Km 60° to 60° elevation over a ground-based terminal device 110, Table I shows the variation of Doppler shift and propagation delay with respect to the elevation angle. The system would therefore experience a maximum normalized Doppler of up to 1.17e-05 and a maximum normalized Doppler drift of up to 2.00e-03.

TABLE 1

Doppler and propagation delay

| Elevation | Time [sec] | Normalized Doppler shift | Normalized Doppler drift [s$^{-1}$] | Propagation delay [sec] | Prop delay drift | RTD [sec] |
|---|---|---|---|---|---|---|
| 60 | 0.00 | 1.17E−05 | −2.02E−07 | 2.28E−03 | −1.16E−05 | 4.56E−03 |
| 60.5 | 0.87 | 1.15E−05 | −2.05E−07 | 2.27E−03 | −1.14E−05 | 4.54E−03 |
| 61 | 1.74 | 1.13E−05 | −2.08E−07 | 2.26E−03 | −1.12E−05 | 4.52E−03 |
| 61.5 | 2.60 | 1.11E−05 | −2.11E−07 | 2.25E−03 | −1.10E−05 | 4.50E−03 |
| 62 | 3.45 | 1.09E−05 | −2.13E−07 | 2.24E−03 | −1.09E−05 | 4.48E−03 |
| 62.5 | 4.29 | 1.08E−05 | −2.16E−07 | 2.23E−03 | −1.07E−05 | 4.46E−03 |
| 63 | 5.13 | 1.06E−05 | −2.18E−07 | 2.22E−03 | −1.05E−05 | 4.44E−03 |
| 63.5 | 5.96 | 1.04E−05 | −2.21E−07 | 2.21E−03 | −1.03E−05 | 4.43E−03 |
| 64 | 6.79 | 1.02E−05 | −2.24E−07 | 2.20E−03 | −1.01E−05 | 4.41E−03 |
| 64.5 | 7.61 | 1.00E−05 | −2.26E−07 | 2.20E−03 | −9.95E−06 | 4.39E−03 |
| 65 | 8.42 | 9.85E−06 | −2.29E−07 | 2.19E−03 | −9.76E−06 | 4.38E−03 |
| 65.5 | 9.23 | 9.67E−06 | −2.31E−07 | 2.18E−03 | −9.58E−06 | 4.36E−03 |
| 66 | 10.04 | 9.48E−06 | −2.33E−07 | 2.17E−03 | −9.39E−06 | 4.34E−03 |
| 66.5 | 10.83 | 9.30E−06 | −2.36E−07 | 2.16E−03 | −9.20E−06 | 4.33E−03 |
| 67 | 11.63 | 9.11E−06 | −2.38E−07 | 2.16E−03 | −9.02E−06 | 4.32E−03 |
| 67.5 | 12.41 | 8.92E−06 | −2.41E−07 | 2.15E−03 | −8.83E−06 | 4.30E−03 |
| 68 | 13.20 | 8.74E−06 | −2.43E−07 | 2.14E−03 | −8.64E−06 | 4.29E−03 |
| 68.5 | 13.97 | 8.55E−06 | −2.45E−07 | 2.14E−03 | −8.45E−06 | 4.27E−03 |
| 69 | 14.75 | 8.36E−06 | −2.47E−07 | 2.13E−03 | −8.26E−06 | 4.26E−03 |
| 69.5 | 15.52 | 8.17E−06 | −2.50E−07 | 2.12E−03 | −8.07E−06 | 4.25E−03 |
| 70 | 16.28 | 7.98E−06 | −2.52E−07 | 2.12E−03 | −7.88E−06 | 4.24E−03 |
| 70.5 | 17.04 | 7.78E−06 | −2.54E−07 | 2.11E−03 | −7.69E−06 | 4.22E−03 |
| 71 | 17.80 | 7.59E−06 | −2.56E−07 | 2.11E−03 | −7.50E−06 | 4.21E−03 |
| 71.5 | 18.55 | 7.40E−06 | −2.58E−07 | 2.10E−03 | −7.30E−06 | 4.20E−03 |
| 72 | 19.30 | 7.21E−06 | −2.60E−07 | 2.09E−03 | −7.11E−06 | 4.19E−03 |
| 72.5 | 20.05 | 7.01E−06 | −2.62E−07 | 2.09E−03 | −6.92E−06 | 4.18E−03 |
| 73 | 20.79 | 6.82E−06 | −2.64E−07 | 2.08E−03 | −6.72E−06 | 4.17E−03 |
| 73.5 | 21.53 | 6.62E−06 | −2.66E−07 | 2.08E−03 | −6.53E−06 | 4.16E−03 |
| 74 | 22.26 | 6.43E−06 | −2.68E−07 | 2.07E−03 | −6.33E−06 | 4.15E−03 |
| 74.5 | 22.99 | 6.23E−06 | −2.69E−07 | 2.07E−03 | −6.13E−06 | 4.14E−03 |
| 75 | 23.72 | 6.04E−06 | −2.71E−07 | 2.07E−03 | −5.94E−06 | 4.13E−03 |
| 75.5 | 24.45 | 5.84E−06 | −2.73E−07 | 2.06E−03 | −5.74E−06 | 4.12E−03 |
| 76 | 25.17 | 5.64E−06 | −2.74E−07 | 2.06E−03 | −5.54E−06 | 4.11E−03 |
| 76.5 | 25.89 | 5.44E−06 | −2.76E−07 | 2.05E−03 | −5.34E−06 | 4.11E−03 |
| 77 | 26.61 | 5.25E−06 | −2.78E−07 | 2.05E−03 | −5.15E−06 | 4.10E−03 |
| 77.5 | 27.32 | 5.05E−06 | −2.79E−07 | 2.05E−03 | −4.95E−06 | 4.09E−03 |
| 78 | 28.04 | 4.85E−06 | −2.80E−07 | 2.04E−03 | −4.75E−06 | 4.08E−03 |
| 78.5 | 28.75 | 4.65E−06 | −2.82E−07 | 2.04E−03 | −4.55E−06 | 4.08E−03 |
| 79 | 29.45 | 4.45E−06 | −2.83E−07 | 2.04E−03 | −4.35E−06 | 4.07E−03 |
| 79.5 | 30.16 | 4.25E−06 | −2.84E−07 | 2.03E−03 | −4.15E−06 | 4.06E−03 |
| 80 | 30.86 | 4.05E−06 | −2.86E−07 | 2.03E−03 | −3.95E−06 | 4.06E−03 |
| 80.5 | 31.57 | 3.85E−06 | −2.87E−07 | 2.03E−03 | −3.75E−06 | 4.05E−03 |
| 81 | 32.27 | 3.65E−06 | −2.88E−07 | 2.02E−03 | −3.55E−06 | 4.05E−03 |

TABLE 1-continued

Doppler and propagation delay

| Elevation | Time [sec] | Normalized Doppler shift | Normalized Doppler drift [s$^{-1}$] | Propagation delay [sec] | Prop delay drift | RTD [sec] |
|---|---|---|---|---|---|---|
| 81.5 | 32.97 | 3.45E−06 | −2.89E−07 | 2.02E−03 | −3.35E−06 | 4.04E−03 |
| 82 | 33.66 | 3.25E−06 | −2.90E−07 | 2.02E−03 | −3.14E−06 | 4.04E−03 |
| 82.5 | 34.36 | 3.04E−06 | −2.91E−07 | 2.02E−03 | −2.94E−06 | 4.03E−03 |
| 83 | 35.05 | 2.84E−06 | −2.92E−07 | 2.02E−03 | −2.74E−06 | 4.03E−03 |
| 83.5 | 35.75 | 2.64E−06 | −2.92E−07 | 2.01E−03 | −2.54E−06 | 4.03E−03 |
| 84 | 36.44 | 2.44E−06 | −2.93E−07 | 2.01E−03 | −2.34E−06 | 4.02E−03 |
| 84.5 | 37.13 | 2.23E−06 | −2.94E−07 | 2.01E−03 | −2.13E−06 | 4.02E−03 |
| 85 | 37.82 | 2.03E−06 | −2.94E−07 | 2.01E−03 | −1.93E−06 | 4.02E−03 |
| 85.5 | 38.51 | 1.83E−06 | −2.95E−07 | 2.01E−03 | −1.73E−06 | 4.01E−03 |
| 86 | 39.19 | 1.63E−06 | −2.96E−07 | 2.01E−03 | −1.53E−06 | 4.01E−03 |
| 86.5 | 39.88 | 1.42E−06 | −2.96E−07 | 2.00E−03 | −1.32E−06 | 4.01E−03 |
| 87 | 40.57 | 1.22E−06 | −2.96E−07 | 2.00E−03 | −1.12E−06 | 4.01E−03 |
| 87.5 | 41.25 | 1.02E−06 | −2.97E−07 | 2.00E−03 | −9.15E−07 | 4.01E−03 |
| 88 | 41.94 | 8.14E−07 | −2.97E−07 | 2.00E−03 | −7.12E−07 | 4.00E−03 |
| 88.5 | 42.62 | 6.10E−07 | −2.97E−07 | 2.00E−03 | −5.09E−07 | 4.00E−03 |
| 89 | 43.31 | 4.07E−07 | −2.97E−07 | 2.00E−03 | −3.05E−07 | 4.00E−03 |
| 89.5 | 43.99 | 2.03E−07 | −2.97E−07 | 2.00E−03 | −1.02E−07 | 4.00E−03 |
| 90 | 44.68 | 0.00E+00 | — | 2.00E−03 | — | 4.00E−03 |

The timing error $t_{err}$ in the system can be caused by primarily:
1. Propagation delay $t_d$ over the pass due to non-terrestrial movement of the base-station 120
2. Local oscillator clock error $t_{LO}$
3. Variation of the propagation delay caused by change in base-station position during the pass due to scheduling latencies Table 2 depicts the variation of round-trip delay (RTD) between 30° elevation to 90° elevation for the same example.

TABLE 2

Elevation angle vs Round Trip Delay

| Elevation angle | Round Trip Delay (RTD) [ms] |
|---|---|
| 30° | 7.17 |
| 35° | 6.45 |
| 40° | 5.89 |
| 45° | 5.44 |
| 50° | 5.08 |
| 55° | 4.79 |
| 60° | 4.56 |
| 65° | 4.38 |
| 70° | 4.24 |
| 75° | 4.13 |
| 80° | 4.06 |
| 85° | 4.02 |
| 90° | 4.00 |

It is to be noted that that for a 60° to 90° elevation pass, all the UEs experience a constant integral part of the RTD is 4 ms. The fractional part varies between 0.001 ms to 0.560 ms.

In accordance with a preferred embodiment, the overall system operation may be broken down into 3 functional steps, namely: UE wake-up, frequency and time synchronization and protocol operation. In order to establish connectivity, the UE must be able to wake up during an available satellite pass, acquire the carrier frequency estimate and track the relative shift of frequency and delay pre-compensated by the UE before every uplink transmission.

Figure 18:
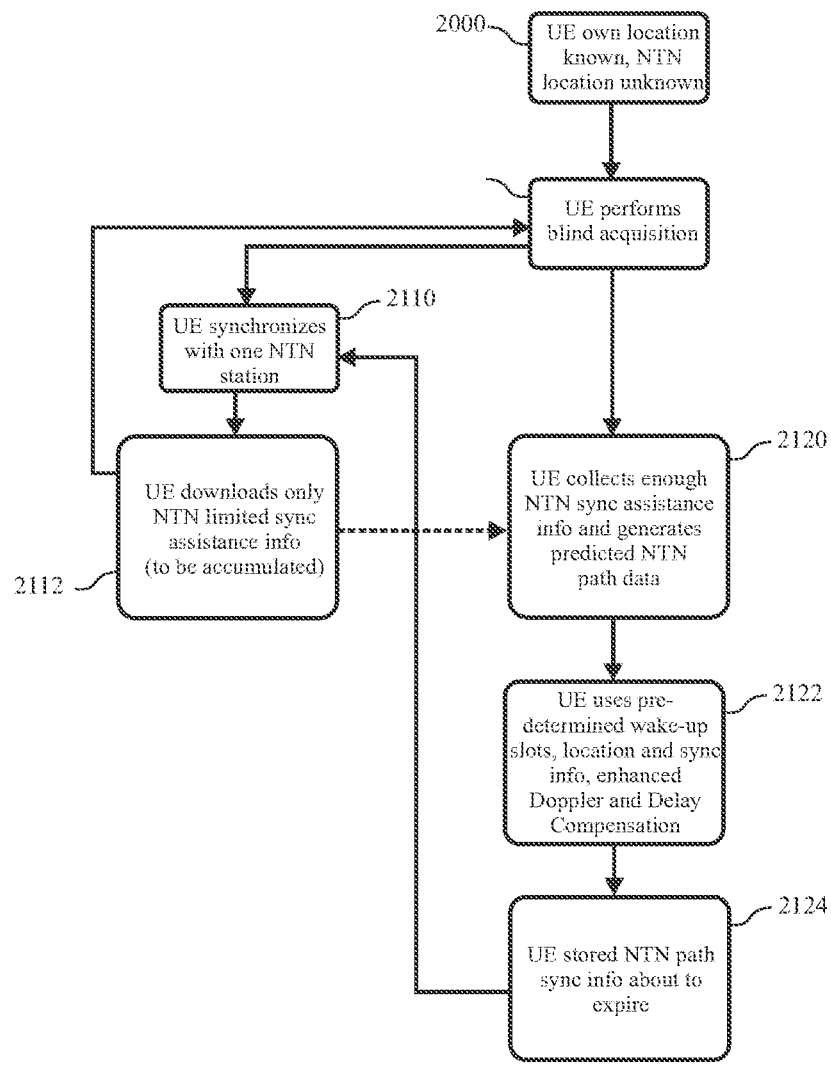
FIG. 18 illustrates the operation of a terminal device, when its location is unknown, in accordance with a preferred embodiment.

The first step is for the ability of the UE to determine when it must wake-up in order to establish communication with the base-station. For this purpose, the UE must have the enriched dataset regarding the path information of each base-station (in this example the satellite TLE) and its own geo-location. The UE operation when its own location is known is shown in FIG. 18, starting at step 2000. At step 2100, the terminal device/UE performs a blind acquisition procedure of a carrier channel. At step 2110, it synchronizes with one airborne/spaceborne base station, and downloads only limited base station synchronization information at subsequent step 2112, before iterating the process so as to accumulate synchronization information over time. Once enough assistance information has been accumulated, the terminal device computes at step 2120 predicted values or estimates for the base station's position, experiences Doppler offset/drift, timing delay, etc . . . . This information is then used at step 2122 to wake-up in accordance with the so-computed wake-up slots, and to compensate for Doppler and delay errors on the carrier. Once the trajectory information for a given base station expires at step 2124, the acquisition loop is started again at step 2110.

Using this concept, as an example, let us consider the procedures involved for NB-IoT. The first step to synchronization is to acquire the frame and the symbol timing and the frequency from the synchronization signals at the physical layer. This is done by the timing and frequency synchronization block in the UE architecture as shown in FIG. 14. This block estimates the Doppler and offset of the frequency. For frequency synchronization, the process involves:

Frequency estimation: This is the process of estimating the complex frequency components of a signal in the presence of noise or channel impairments.

Frequency compensation: Once the frequency is estimated, next the deviation of the local clock frequency with the estimated frequency is computed and this computed frequency deviation is compensated to decode the further channels Frequency tracking: once the frequency is estimated and deviation is computed, then it has to be constantly monitored and tracked to keep the deviation under a certain limit.

Pre-compensation: The estimated frequency offset, and timing error is used as input to drive the analog front end to pre-compensate the uplink transmission.

The acquired timing and frequency of the downlink allows the UE to initially synchronize itself relative to the non-terrestrial payload decode the broadcast channel and other downlink transmissions.

This estimated frequency offset is also input to the timing and frequency control block which is used to pre-compensate and correct the Doppler shift and frequency and timing errors of the local oscillator during the uplink transmission. To that effect a time compensation value may be added to the timing of a scheduled data transmission, and a frequency compensation value may be added to the transmission frequency of a scheduled data transmission to the basestation. Alternatively, this estimated frequency offset and the predicted mean/median/min/actual Doppler drift is also input to the timing and frequency control block which is used to pre-compensate and correct the Doppler shift, the Doppler drift and frequency and timing errors of the local oscillator during the uplink transmission. Indeed, as detailed in Table 1, the Doppler drift is always negative and comprised within a predefined range. Pre-compensating the uplink using the estimated frequency offset and then adding the min/mean/median/actual Doppler drift is going to reduce the residual frequency offset during the uplink transmission.

Alternatively, the timing and frequency synchronization block may be assisted by external inputs from the Doppler and delay prediction map computed by the application and management layer to achieve synchronization and implement pre-compensation. For example, filtering the measured delay and Doppler using the predicted values can increase the accuracy.

For example, knowing the position of the user terminal and the base station allows to determine the Doppler shift and the delay of propagation.

$\vec{r}_1$ is the Earth Centred Earth Fixed (ECEF) position of the user terminal $\vec{r}_2$ is the ECEF position of the satellite $\vec{r}_3$ is the relative position between the user terminal and the satellite=$\vec{r}_2 - \vec{r}_1$ It is relatively easy to calculate the Doppler shift and the propagation delay if all state vectors are in the same frame as ECEF (Earth Centred, Earth Fixed frame). The indices "sat" and "ue" are respectively the satellite and the user terminal.

$p_{sat} = [x_{sat}; y_{sat}; z_{sat}] = \vec{r}_2 \Rightarrow [m]$ $v_{sat} = [x_{sat}; y_{sat}; z_{sat}] \Rightarrow [m/s]$ $p_{ue}[x_{sat}; y_{sat}; z_{sat}] = \vec{r}_1 \Rightarrow [m]$ $v_{ue} = [0;0;0]$ c=speed of an electromagnetic wave [m/s]

Here the speed of the user terminal in ECEF is considered as zero. This means that the user terminal is not moving.

The propagation delay is simply the distance between the user terminal and the satellite (the range) divided by the velocity of an electromagnetic wave (c) as shown below.

$$\text{delay}_{prop} = \frac{(\|p_{sat} - p_{ue}\|)}{c} = \frac{\|\vec{r}_3\|}{c} \Rightarrow \frac{[m]}{[m/s]} \Rightarrow [s]$$

The Doppler shift is the dot product between the velocity vector of the satellite and the normalized range vector.

$$\text{doppler}_{shift} = \left(\vec{v}_{sat} \cdot \frac{\vec{r}_3}{\|\vec{r}_3\|}\right) * \frac{\text{frequency}}{c} \Rightarrow \left(\left[\frac{m}{s}\right] * \frac{[m]}{[m]}\right) * \frac{[Hz]}{[m/s]} \Rightarrow [Hz]$$

It is to be noted that, at the physical layer, only the timing errors of the LO are corrected and pre-compensated for the uplink transmission but the shift in the Time of Arrival, TOA, due to the propagation delay is not corrected by this block. This is taken care of by the Timing Advance command which is issued by the EnodeB as a part of the MAC layer message to the UE. This is described in the following section.

It is to be noted that as discussed in Table II, UEs experience a round-trip delay, RTD, of at least 4 ms which can be always taken into account and ignored by the scheduler (of the eNodeB) for uplink reception or by means of pre-emptive resource assignment by the UE MAC controller considering the fixed part of RTD.

Figures 19A, 19B:
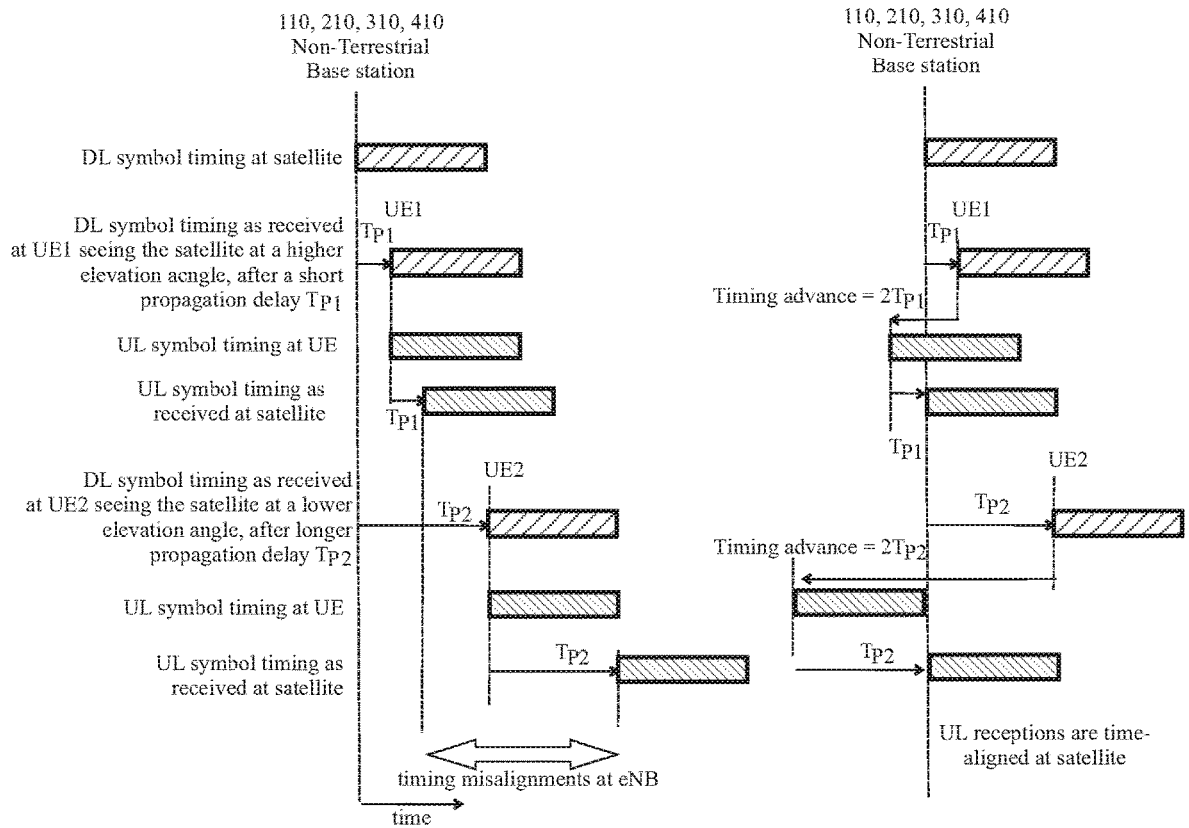
FIGS. 19A and 19B illustrate timing alignment of an uplink transmission (a) without timing advance and (b) with timing advance in accordance with a preferred embodiment of the invention.

For the fractional part of the RTD, at 70° elevation the variation is 0.240 ms which can be communicated by the timing advance command from the MAC layer of the EnodeB as a part of the Random-Access Response message (for NPRACH) or the MAC Control Element (MAC CE) for the NPUSCH. The timing advance concept is depicted in FIGS. 19A and 19B.

After a UE 110 has first synchronized its receiver to the downlink transmissions received from the ENodeB 120, the initial timing advance is set by means of the random-access procedure. This involves the UE transmitting a random-access preamble on the uplink from which the eNodeB estimates the initial uplink timing offset. The EnodeB responds with a 11-bit initial timing advance command contained within the Random-Access Response (RAR) which is a MAC layer message. This timing advance value is used by the UE to align itself in time for the consecutive uplink transmission.

Figure 20:
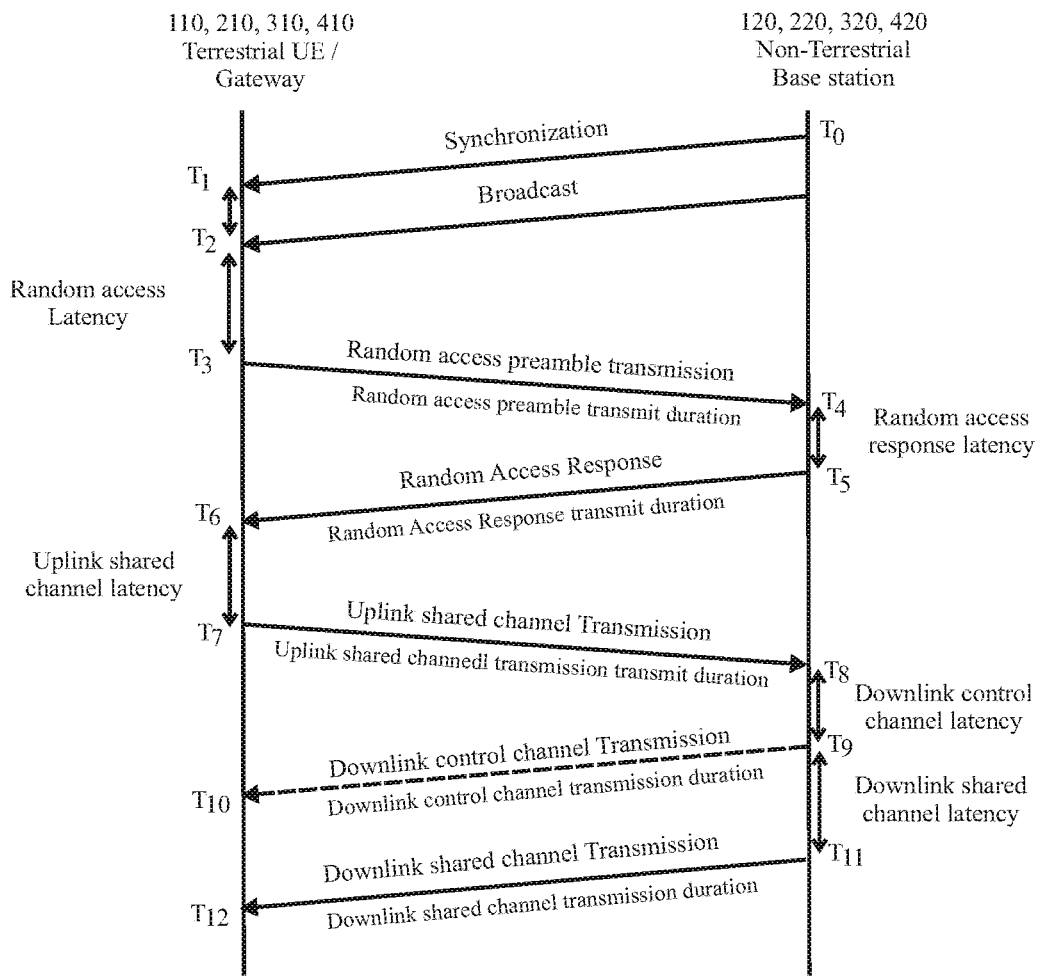
FIG. 20 illustrates an example scenario of the system operation in accordance with an embodiment of the invention.

To describe the system operation, the example scenario in FIG. 20 is considered.

Once the UE 110 wakes up at $T_0$ and take $T_1$ ms to acquire the downlink synchronization signals (NPSS and NSSS) and achieve frame and time synchronization relative to the satellite EnodeB 120, after which it can decode the broadcast signals at $T_2$ ms while tracking the downlink (frequency shift and delay shift). It can estimate the frequency and delay shift on the downlink until $T_2$ ms. The UE waits for next available random-access window and it transmits the random-access preamble at $T_3$ ms. However, the UE is unable to estimate the shift in the frequency and delay during this random-access latency period (UE processing time for preamble preparation and transmission) of $T_3-T_2$ ms. The UE shall transmit the random-access preamble at $T_3$ after pre-compensating this shift in delay and frequency estimated at $T_2$. An alternative would be to add the mean, median, the min or the predicted doppler and time drift to the delay and frequency estimation as follows:

For the frequency offset using the mean Doppler drift:
$F_{overall} = F_{DLestim} + F_{mean-drift} * I_{DL-UL}$ latency.

For the frequency offset using the median Doppler drift:
$F_{overall} = F_{DLestim} + F_{median-drift} * t_{DL-UL\ latency}$.

For the frequency offset using the minimum Doppler drift:
$F_{overall} = F_{DLestim} + F_{min-drift} * t_{DL-UL\ latency}$.

Other filtering methods may be used without departing from the scope of the present invention.

However, once it has transmitted the random-access preamble, the UE switches to receive mode and is able to track the downlink again using the reference symbols on the downlink and the cyclic prefix of the received downlink messages.

The base-station 120 receives the preamble at $T_4$ ms, estimates the shift in delay of the preamble caused during $T_4$-$T_2$ ms for demodulation of the preamble and prepares the Random Access Response (RAR) and transmits it within the minimum RAR latency period (which is configurable by the scheduler and takes into the account the integer part of the propagation delay to pre-schedule the RAR) at $T_5$ ms. The base-station can also communicate the relative shift (fractional part of the RTD) in the actual time of arrival of the preamble against the expected time of arrival in the Timing Advance Command.

While the UE 110 is listening to the downlink for its corresponding RAR, it is able to keep the synchronization and estimates the shift in frequency and delay at the physical layer until it receives it RAR at $T_6$ ms. This is taken as input by the UE's MAC controller to prepare and pre-compensate the uplink shared channel transmission at $T_7$ ms. However, the UE is unable to track the frequency and delay shift during the uplink shared channel latency period of $T_7$-$T_6$ ms and transmits the uplink shared channel packet without pre-compensating for the shifts during this period. An alternative would be to add the mean, median, the min or the predicted Doppler and time drift to the delay and frequency estimation as follow for the frequency offset using the mean Doppler drift: $F_{overall}=F_{DLestim}+F_{mean\text{-}drat}*t_{DL\text{-}UL\ latency}$. Once it ends transmission, the UE can resume tracking the downlink from $T_7$ ms until $T_{12}$ ms.

The base-station receives the uplink shared channel packet with the shift of frequency and delay not compensated by the UE for the uplink shared channel latency period (UE processing for packet preparation) and decodes the uplink shared channel. The efficiency of this frequency and delay shift estimator at the base-station is a deterministic factor on the tolerance of the error in pre-compensation by the UE for the uplink due to the latency periods between the time of reception of the last downlink to the corresponding uplink transmission.

This sequence is valid for all consecutive uplink and downlink transmissions for the entire protocol sequence as long as the estimator performs with the acceptable tolerance. Otherwise, if at some limit the estimator's error exceeds the tolerance, a resynchronization required.

The described aspects in accordance with the embodiments may be used as distinct methods (for UE localization, for Doppler/Time pre-compensation on the uplink, etc. . . . ) or they may be combined with one another unless specifically stated otherwise. It will be understood that the present disclosure includes all feature combinations. Specifically, the claimed features may be combined.

It should be noted that features described for a specific embodiment described herein may be combined with the features of other embodiments unless the contrary is explicitly mentioned. Based on the description and figures that has been provided, a person with ordinary skills in the art will be enabled to develop a computer program for implementing the described methods without undue burden.

It should be understood that the detailed description of specific preferred embodiments is given by way of illustration only, since various changes and modifications will be apparent to the person skilled in the art. The scope of protection is defined by the following set of claims.

The invention claimed is:

1. A method for estimating a location of a terminal device of a non-terrestrial cellular data communication network, the non-terrestrial cellular data communication network comprising at least one airborne or spaceborne base station moving along a flight trajectory, the terminal device and a location service node storing information describing the flight trajectory of the at least one airborne or spaceborne base station, the method comprising:
   at the terminal device, performing a random wake-up and a blind acquisition of a carrier that is made available by the at least one airborne or spaceborne base station;
   at the terminal device, accumulating over time respective arrival times of a reference timing signal received from at least three different positions taken by the at least one airborne or spaceborne base station;
   at the terminal device, computing, from said respective arrival times, at least two arrival time differences with respect to one reference arrival time;
   at the terminal device, transmitting said at least two arrival time differences to said location service node, through said the at least one airborne or spaceborne base station;
   at said location service node, receiving said at least two arrival time differences, computing a location estimate of said terminal device using said at least two arrival time differences and said stored information describing the flight trajectory of the at least one airborne or spaceborne base station, and transmitting said location estimate to said terminal device, through the at least one airborne or spaceborne base station;
   at the terminal device, receiving said location estimate from the at least one airborne or spaceborne base station and storing it in a memory element of the terminal device.

2. The method according to claim 1, wherein performing the random wake-up and the blind acquisition of the carrier further comprises using offset estimates of a most recent downlink to pre-compensate its uplink transmission to attach itself to the network.

3. The method according to claim 1, further comprising, upon successful blind acquisition of the carrier, at the terminal device, downloading synchronization assistance information from the at least one airborne or spaceborne base station.

4. The method according to claim 1, further comprising, upon successful blind acquisition of the carrier, at the terminal device, sending a location service request to the at least one airborne or spaceborne base station.

5. The method according to claim 1, wherein the respective arrival times are accumulated from a single airborne or spaceborne base station base station changing its position relative to the terminal device over time.

6. The method according to claim 1, wherein the non-terrestrial cellular data communication network comprises a plurality of airborne or spaceborne base stations each being configured to transmit a common synchronized reference timing signal, wherein the respective arrival times are accumulated from a set of the plurality of plurality of airborne or spaceborne base stations that are within the terminal device's line of sight at a same time, or from set of the plurality of plurality of airborne or spaceborne base stations changing their positions relative to the terminal device over time.

7. A method for estimating a location of a terminal device of a non-terrestrial cellular data communication network, the non-terrestrial cellular data communication network comprising at least one airborne or spaceborne base station moving along a flight trajectory, the terminal device and a location service node storing information describing the flight trajectory of the at least one airborne or spaceborne base station, the method comprising:
- at the terminal device, accumulating over time respective arrival times of a reference timing signal received from at least three different positions taken by the at least one airborne or spaceborne base station;
- at the terminal device, computing, from said respective arrival times, at least two arrival time differences with respect to one reference arrival time;
- at the terminal device, transmitting said at least two arrival time differences to said location service node, through said the at least one airborne or spaceborne base station;
- at said location service node, receiving said at least two arrival time differences, computing a location estimate of said terminal device using said at least two arrival time differences and said stored information describing the flight trajectory of the at least one airborne or spaceborne base station, and transmitting said location estimate to said terminal device, through the at least one airborne or spaceborne base station;
- at the terminal device, receiving said location estimate from the at least one airborne or spaceborne base station and storing it in a memory element of the terminal device;
- providing flight trajectory data for said at least one airborne or spaceborne base station in a memory element of said terminal device;
- at the terminal device, determining, based on said flight trajectory data for said at least one airborne or spaceborne base station and on said location estimate, at least one time slot during which a wireless communication channel between said terminal device and said at least one airborne or spaceborne base station is estimated to be available; and
- at the terminal device, scheduling a data reception or transmission between said terminal device and said at least one airborne or spaceborne base station during the determined time slot.

8. A method for estimating a location of a terminal device of a non-terrestrial cellular data communication network, the non-terrestrial cellular data communication network comprising at least one airborne or spaceborne base station moving along a flight trajectory, the terminal device and a location service node storing information describing the flight trajectory of the at least one airborne or spaceborne base station, the method comprising:
- at the terminal device, performing a random wake-up and a blind acquisition of a carrier that is made available by the at least one airborne or spaceborne base station;
- at the terminal device, accumulating over time respective arrival times of a reference timing signal received from at least three different positions taken by the at least one airborne or spaceborne base station;
- at the terminal device, transmitting said arrival times to said location service node, through said the at least one airborne or spaceborne base station;
- at said location service node, receiving said arrival times, computing, from said arrival times, at least two arrival time differences with respect to one reference arrival time, computing a location estimate of said terminal device using said at least two arrival time differences and said stored information describing the flight trajectory of the at least one airborne or spaceborne base station, and transmitting said location estimate to said terminal device, through the at least one airborne or spaceborne base station;
- at the terminal device, receiving said location estimate from the at least one airborne or spaceborne base station and storing it in a memory element of the terminal device.

9. The method according to claim 8, wherein performing the random wake-up and the blind acquisition of the carrier further comprises using offset estimates of a most recent downlink to pre-compensate its uplink transmission to attach itself to the network.

10. The method according to claim 8, further comprising, upon successful blind acquisition of the carrier, at the terminal device, downloading synchronization assistance information from that the at least one airborne or spaceborne base station.

11. The method according to claim 8, further comprising, upon successful blind acquisition of the carrier, at the terminal device, sending a location service request to the at least one airborne or spaceborne base station.

12. The method according to claim 8, wherein the respective arrival times are accumulated from a single airborne or spaceborne base station base station changing its position relative to the terminal device over time.

13. The method according to claim 8, wherein the non-terrestrial cellular data communication network comprises a plurality of airborne or spaceborne base stations each being configured to transmit a common synchronized reference timing signal, wherein the respective arrival times are accumulated from a set of the plurality of plurality of airborne or spaceborne base stations that are within the terminal device's line of sight at a same time, or from set of the plurality of plurality of airborne or spaceborne base stations changing their positions relative to the terminal device over time.

14. A method for estimating a location of a terminal device of a non-terrestrial cellular data communication network, the non-terrestrial cellular data communication network comprising at least one airborne or spaceborne base station moving along a flight trajectory, the terminal device and a location service node storing information describing the flight trajectory of the at least one airborne or spaceborne base station, the method comprising:
- at the terminal device, accumulating over time respective arrival times of the reference timing signal received from at least three different positions taken by the at least one airborne or spaceborne base station;
- at the terminal device, transmitting said respective arrival times to said location service node, through said the at least one airborne or spaceborne base station;
- at said location service node, receiving said respective arrival times, computing, from said respective arrival times, at least two arrival time differences with respect to one reference arrival time, computing a location estimate of said terminal device using said at least two arrival time differences and said stored information describing the flight trajectory of the at least one airborne or spaceborne base station, and transmitting said location estimate to said terminal device, through the at least one airborne or spaceborne base station;
- at the terminal device, receiving said location estimate from the at least one airborne or spaceborne base station and storing it in a memory element of the terminal device;

providing flight trajectory data for said at least one airborne or spaceborne base station in a memory element of said terminal device;

at the terminal device, determining, based on said flight trajectory data for said at least one airborne or spaceborne base station and on said location estimate, at least one time slot during which a wireless communication channel between said terminal device and said at least one airborne or spaceborne base station is estimated to be available; and at the terminal device, scheduling a data reception or transmission between said terminal device and said at least one airborne or spaceborne base station during the determined time slot.

15. A terminal device for a non-terrestrial cellular data communication network, the terminal device comprising:

a data reception unit configured to receive a reference timing signal from at least one airborne or spaceborne base station;

a processing unit configured to:
 perform a random wake-up and a blind acquisition of a carrier that is made available by the at least one airborne or spaceborne base station,
 accumulate over time respective arrival times of the reference timing signal received from at least three different positions taken by the at least one airborne or spaceborne base station,
 compute, from said respective arrival times, at least two arrival time differences with respect to one reference arrival time; and a data transmission unit configured to transmit said at least two arrival time differences to a location service node, through said the at least one airborne or spaceborne base station;

wherein the data reception unit is further configured to receive a location estimate of the terminal device from the at least one airborne or spaceborne base station;

wherein the terminal device further comprises a memory element configured to store the location estimate of the terminal device.

16. The terminal device according to claim 15, wherein the processing unit is further configured to perform the random wake-up and the blind acquisition of the carrier by using offset estimates of a most recent downlink to pre-compensate an uplink transmission to attach itself to the network.

17. The terminal device according to claim 15, wherein the processing unit is further configured to, upon successful blind acquisition of the carrier, download synchronization assistance information from the at least one airborne or spaceborne base station.

18. The terminal device according to claim 15, wherein the processing unit is further configured to, upon successful blind acquisition of the carrier, send a location service request to the at least one airborne or spaceborne base station.

19. A terminal device for a non-terrestrial cellular data communication network, the terminal device comprising:

a data reception unit configured to receive a reference timing signal from at least one airborne or spaceborne base station;

a processing unit configured to:
 perform a random wake-up and a blind acquisition of a carrier that is made available by the at least one airborne or spaceborne base station, and
 accumulate over time respective arrival times of the reference timing signal received from at least three different positions taken by the at least one airborne or spaceborne base station; and a data transmission unit configured to transmit said respective arrival times to a location service node, through said the at least one airborne or spaceborne base station;

wherein the data reception unit is further configured to receive a location estimate of the terminal device from the at least one airborne or spaceborne base station; and wherein the terminal device further comprises a memory element configured to store the location estimate of the terminal device.

20. The terminal device according to claim 19, wherein the processing unit is further configured to perform the random wake-up and the blind acquisition of the carrier by using offset estimates of a most recent downlink to pre-compensate an uplink transmission to attach itself to the network.

21. The terminal device according to claim 19, wherein the processing unit is further configured to, upon successful blind acquisition of the carrier, download synchronization assistance information from the at least one airborne or spaceborne base station.

22. The terminal device according to claim 19, wherein the processing unit is further configured to, upon successful blind acquisition of the carrier, send a location service request to the at least one airborne or spaceborne base station.

23. A non-terrestrial cellular data communication system comprising:

one or more airborne or spaceborne base stations each configured to transmit a reference timing signal;

a location service node storing information describing each base station's respective flight trajectory; and a terminal device comprising:
 a data reception unit configured to receive a reference timing signal from at least one airborne or spaceborne base station;
 a processing unit configured to:
  perform a random wake-up and a blind acquisition of a carrier that is made available by the at least one airborne or spaceborne base station,
  accumulate over time respective arrival times of the reference timing signal received from at least three different positions taken by the at least one airborne or spaceborne base station, and
  compute, from said respective arrival times, at least two arrival time differences with respect to one reference arrival time;
 a data transmission unit configured to transmit said at least two arrival time differences to the location service node, through at least one airborne or spaceborne base station;
 wherein the data reception unit is further configured to receive a location estimate of the terminal device from at least one airborne or spaceborne base station; and
 a memory element configured to store the location estimate of the terminal device;

wherein the location service node is configured to receive the at least two arrival time differences, compute the location estimate of the terminal device using the at least two arrival time differences and the stored information describing each of the reference timing signal transmitting base station's respective flight trajectory, and transmit the location estimate to the terminal device, through one of the one or more airborne or spaceborne base stations.

24. A non-terrestrial cellular data communication system comprising:

one or more airborne or spaceborne base stations each configured to transmit a reference timing signal;

a location service node storing information describing each base station's respective flight trajectory; and a terminal device comprising:

a data reception unit configured to receive a reference timing signal from at least one airborne or spaceborne base station;

a processing unit configured to:

perform a random wake-up and a blind acquisition of a carrier that is made available by the at least one airborne or spaceborne base station, and accumulate over time respective arrival times of the reference timing signal received from at least three different positions taken by the at least one airborne or spaceborne base station;

a data transmission unit configured to transmit said respective arrival times to a location service node, through at least one airborne or spaceborne base station;

wherein the data reception unit is further configured to receive a location estimate of the terminal device from at least one airborne or spaceborne base station; and a memory element configured to store the location estimate of the terminal device, wherein the location service node is configured to receive the respective arrival times, compute, from the respective arrival times, at least two arrival time differences with respect to one reference arrival time, compute the location estimate of the terminal device using the at least two arrival time differences and the stored information describing each of the reference timing signal transmitting base station's respective flight trajectory, and transmit the location estimate to the terminal device, through one of the one or more airborne or spaceborne base stations.

* * * * *